United States Patent
Jahanbanifar et al.

(10) Patent No.: US 11,099,860 B2
(45) Date of Patent: Aug. 24, 2021

(54) RUNTIME ADJUSTMENT OF CONFIGURATION MODELS FOR CONSISTENCY PRESERVATION

(71) Applicants: Azadeh Jahanbanifar, Montreal (CA); Maria Toeroe, Montreal (CA); Ferhat Khendek, Montreal (CA)

(72) Inventors: Azadeh Jahanbanifar, Montreal (CA); Maria Toeroe, Montreal (CA); Ferhat Khendek, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 535 days.

(21) Appl. No.: 15/758,622

(22) PCT Filed: Sep. 15, 2015

(86) PCT No.: PCT/IB2015/057099
§ 371 (c)(1),
(2) Date: Mar. 8, 2018

(87) PCT Pub. No.: WO2017/046630
PCT Pub. Date: Mar. 23, 2017

(65) Prior Publication Data
US 2018/0246736 A1    Aug. 30, 2018

(51) Int. Cl.
*G06F 9/445* (2018.01)
*G06F 8/656* (2018.01)
*G06F 9/50* (2006.01)

(52) U.S. Cl.
CPC .......... *G06F 9/44552* (2013.01); *G06F 8/656* (2018.02); *G06F 9/44505* (2013.01); *G06F 9/50* (2013.01); *G06F 9/5061* (2013.01)

(58) Field of Classification Search
CPC .. G06F 8/656; G06F 9/44505; G06F 9/44552; G06F 9/50; G06F 9/5061
See application file for complete search history.

(56) References Cited

U.S. PATENT DOCUMENTS

| 6,002,854 A | 12/1999 | Lynch et al. |
| 7,069,537 B2 | 7/2006 | Lazarov |

(Continued)

OTHER PUBLICATIONS

Azadeh Jahanbanifar et al.: "Partial Validation of Configuration at Runtime", 2015 IEEE 18th. Intl. Symposium on Real-Time Distributed Computing, Apr. 1, 2015; pp. 288-291, XP055204833.
(Continued)

*Primary Examiner* — Terrell S Johnson
(74) *Attorney, Agent, or Firm* — Ericsson Canada Inc.; Julie Dufort

(57) ABSTRACT

A system performs runtime adjustment of a configuration model. The system receives, at runtime, a change request directed at one or more modified entities in the configuration model. Based on leadership information, one or more infringing entities are identified among the one or more modified entities. The leadership information indicates an impact that one entity has on another entity with respect to a given constraint. Based on the leadership information, a propagation scope is identified for a constraint violated by an infringing entity. The propagation scope includes the infringing entity and other entities that are potentially affected by the request. For resolving single constraint violation, a collection of paths are created in the propagation scope and a path is selected one at a time starting from the shortest path in the collection. For resolving multiple constraint violation, a bonded path is formed for a group of propagation scopes that overlap.

26 Claims, 10 Drawing Sheets

(56) References Cited

U.S. PATENT DOCUMENTS

| | | | | |
|---|---|---|---|---|
| 8,726,264 | B1* | 5/2014 | Allen | G06F 8/658 717/168 |
| 2012/0304174 | A1* | 11/2012 | Arnold | G06F 8/36 718/1 |

OTHER PUBLICATIONS

Azadeh Jahanbanifar et al.: "A Model-Based Approach for the Integration of Configuration Fragments", Jul. 17, 2015; pp. 125-136, XP047314858.

Dmtf: "Optical Virtualization Format Specification, v1.1.0", Jan. 12, 2010; pp. 10-39, XP055009707.

White et al.: "Automated Reasoning for Multi-step Feature Model Configuration Problems"; 10 pages; San Francisco, USA 2009.

Neema et al.: "Constraint-guided Self-adaptation"; 13 pages; 2003.

Xiong et al.: "Generating Range Fixes for Software Configuration"; 11 pages; IEEE 2012.

Song et al.: "Self-adaptation with End-User Preferences: Using Run-Time Models and Constraint Solving"; 17 pages; 2013.

Egyed et al.: Generating and Evaluating Choices for Fixing Inconsistencies in UML Design Models; 10 pages; 2008.

Xiong et al.: "Supporting Automatic Model Inconsistency Fixing"; 10 pages; Aug. 24-28, 2009.

Schulte et al.: "Efficient Constraint Propagation Engines"; 43 pages; Dec. 2008.

I. Warren et al.: "An Automated Formal Approach to Managing Dynamic Reconfiguration", IEEE 2006, 10 pages.

DMTF: "Open Virtualization Format Specification", Document No. DSP0243, Version 2.1.0, Dec. 12, 2013, 72 pages.

A. Jahanbanifar et al.: "Partial Validation of Configurations at Runtime", 2015 IEEE 18th. International Symposium on Real-Time Distributed Computing, 4 pages.

P. Sawyer et al.: "Using Constraint Programming to Manage Configurations in Self-Adaptive Systems", IEEE Computer Society, 2012 IEEE, 8 pages.

J. O. KEPHART: "Research Challenges of Autonomic Computing", ICSE'05, St. Louis, Missouri, USA, May 15-21, 2005, 8 pages.

V. Poladian et al.: "Dynamic Configuration of Resource-Aware Services", Proceedings of the 26th. International Conference on Software Engineering (ICSE'04), 2004 IEEE, 10 pages.

M. Salehie et al.: "Self-Adaptive Software: Landscape and Research Challenges", ACM Transactions on Autonomous and Adaptive Systems, vol. V, No. N, Mar. 2009, 40 pages.

C. Nentwich et al.: "Consistency Management with Repair Actions", Proceedings of the 25th. International Conference on Software Engineering (ICSE'03), 2003 IEEE, 10 pages.

R. Reiter: "A Theory of Diagnosis from First Principles", Elsevier Science Publishers B.V. (North-Holland), 1987, 39 pages.

R. Van Der Straeten et al.: "A formal approach to model refactoring and model refinement", Softw Syst Model 2007, DOI 10.1007/s10270-006-0025-9, 24 pages.

J. White et al.: "Automated diagnosis of feature model configurations", The Journal of Systems and Software 83 (2010) 1094-1107, 14 pages.

A. Egyed: "Automatically Detecting and Tracking Inconsistencies in Software Design Models", IEEE Transactions on Software Engineering, vol. 37, No. 2, Mar./Apr. 2011, 17 pages.

J. Schoenboeck et al.: "CARE—A Constraint-Based Approach for Re-Establishing Conformance-Relationships", Proceedings of the Tenth Asia-Pacific Conference on Conceptual Modelling (APCCM 2014), Auckland, New Zealand, 10 pages.

M. Salehie et al.: "Change Support in Adaptive Software: A Case Study for Fine-Grained Adaptation", 2009 Sixth IEEE Conference and Workshops on Engineering of Autonomic and Autonomous Systems, 10 pages.

Y. Xiong et al.: "Supporting Automatic Model Inconsistency Fixing", ESEC-FSE'09, Aug. 24-28, 2009, Amsterdam, The Netherlands, 10 pages.

J. O. KEPHART et al.: "The Vision of Autonomic Computing", Published by the IEEE Computer Society, Jan. 2003, 10 pages.

H. Khanh Dam et al.: "Towards rational and minimal change propagation in model evolution", School of Computer Science and Software Engineering, University of Wollongong, Northfields Av, Wollongong, NSW 2522, Australia, Feb. 25, 2014, 12 pages.

* cited by examiner

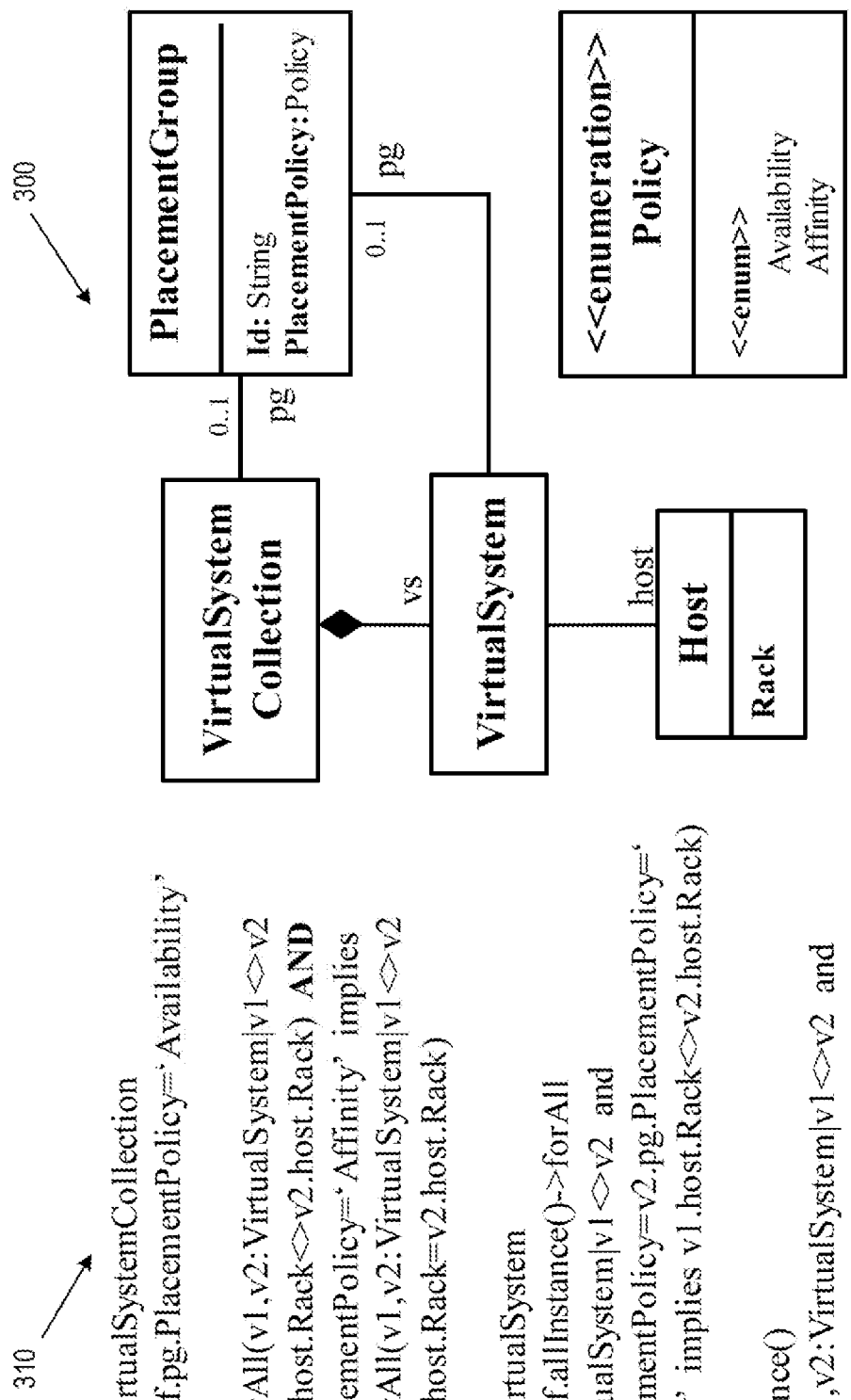

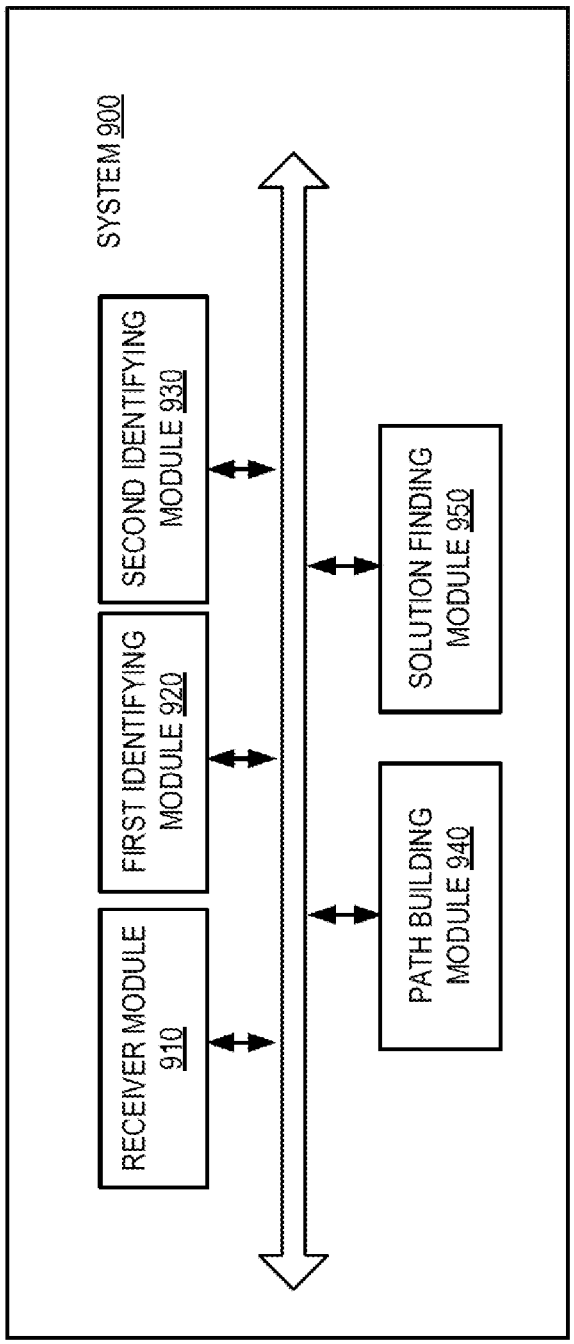
FIG. 9
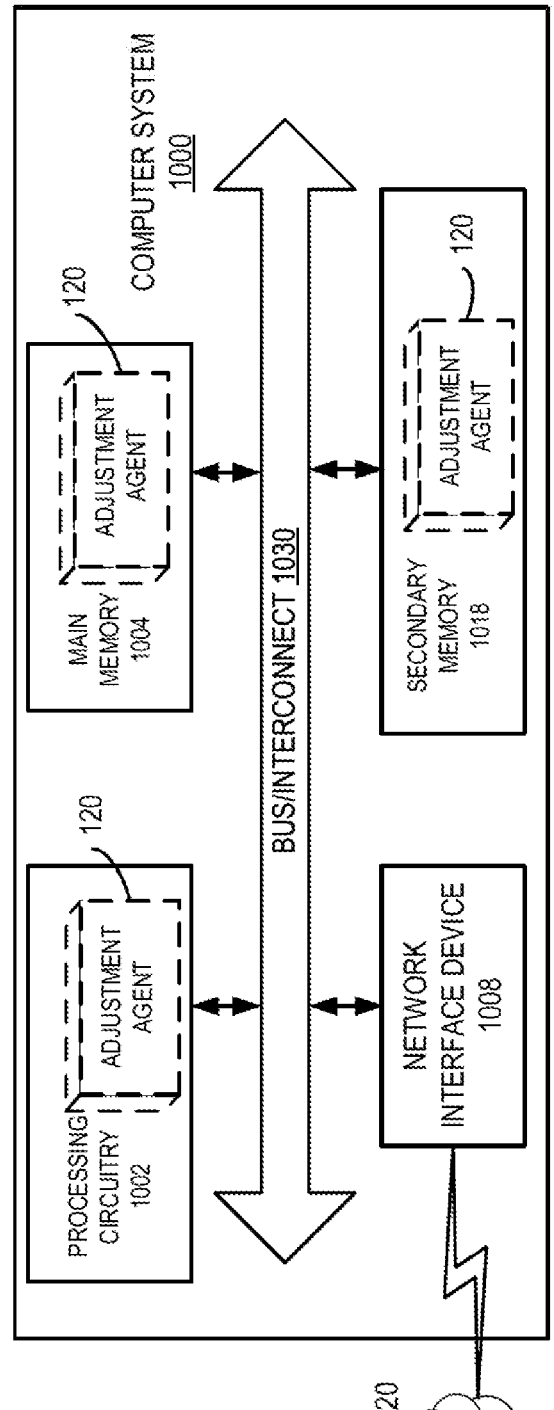
FIG. 10

RUNTIME ADJUSTMENT OF CONFIGURATION MODELS FOR CONSISTENCY PRESERVATION

TECHNICAL FIELD

Embodiments of the invention relate to management of a system configuration.

BACKGROUND

A system configuration consists of many entities with many configuration attributes that are interrelated by system constraints. A system configuration is consistent when all the constraints are satisfied by the entities, their attributes and relations. At runtime a system configuration may be modified, for instance, in response to changes in the system environment or for the purposes of fine-tuning the system security or performance. These changes may jeopardize the configuration consistency as some constraints may be violated. A violation of a constraint means that the changes are not safe and/or incomplete. This could be caused by an administrator who requests the changes but is not aware of all the relations between all involved entities and attributes.

In some systems, a set of consistency rules or system constraints are defined to guarantee the consistency of the configuration and avoid system malfunctioning. Thus, any reconfiguration requests are to be checked against the system constraints.

Some systems use configuration checkers to detect these violations and veto the proposed changes if the changes violate the consistency rules. Such an approach is inflexible because in some cases constraint violations might be resolvable.

SUMMARY

According to one embodiment, a method for runtime adjustment of a configuration model is provided. The method comprises: receiving, at runtime, a change request directed at one or more modified entities in the configuration model; identifying an infringing entity among the one or more modified entities based on leadership information, wherein the leadership information indicates an impact that one entity has on another entity with respect to a given constraint, and wherein the infringing entity violates at least one constraint in the configuration model; identifying, based on the leadership information, a propagation scope for the infringing entity and a constraint violated by the infringing entity, wherein the propagation scope includes the infringing entity and a set of other entities that are potentially affected by the change request; creating a collection of paths in the propagation scope, each path connecting the infringing entity to one or more of the other entities; and starting from a shortest path, selecting a path at a time from the collection to find a runtime adjustment solution for the selected path such that no constraints in the propagation scope are violated.

According to another embodiment, a system is provided for performing runtime adjustment of a configuration model. The system comprises: a memory and processing circuitry coupled to the memory. The processing circuitry is adapted to: receive, at runtime, a change request directed at one or more modified entities in the configuration model; identify an infringing entity among the one or more modified entities based on leadership information, wherein the leadership information indicates an impact that one entity has on another entity with respect to a given constraint, and wherein the infringing entity violates at least one constraint including a violated constraint in the configuration model; identify, based on the leadership information, a propagation scope for the infringing entity and a constraint violated by the infringing entity, wherein the propagation scope includes the infringing entity and a set of other entities that are potentially affected by the change request; create a collection of paths in the propagation scope, each path connecting the infringing entity to one or more of the other entities; and starting from a shortest path, select a path at a time from the collection to find a runtime adjustment solution for the selected path such that no constraints in the propagation scope are violated.

According to yet another embodiment, a system is provided for performing runtime adjustment of a configuration model. The system comprises: a receiver module adapted to receive, at runtime, a change request directed at one or more modified entities in the configuration model; a first identifying module adapted to identify an infringing entity among the one or more modified entities based on leadership information, wherein the leadership information indicates an impact that one entity has on another entity with respect to a given constraint, and wherein the infringing entity violates at least one constraint in the configuration model; a second identifying module adapted to identify, based on the leadership information, a propagation scope for the infringing entity and a constraint violated by the infringing entity, the propagation scope including the infringing entity and a set of other entities that are potentially affected by the change request; a path building module adapted to create a collection of paths in the propagation scope, each path connecting the infringing entity to one or more of the other entities; and a solution finding module adapted to select a path at a time, starting from a shortest path, from the collection to find a runtime adjustment solution for the selected path such that no constraints in the propagation scope are violated.

According to one embodiment, a method for runtime adjustment of a configuration model is provided. The method comprises: receiving, at runtime, a change request directed at one or more modified entities in the configuration model; identifying a set of infringing entities among the one or more modified entities based on leadership information, wherein the leadership information indicates an impact that one entity has on another entity with respect to a given constraint, and wherein the set of infringing entities violate a plurality of constraints in the configuration model; identifying a propagation scope for each violated constraint of the plurality of constraints, wherein the propagation scope includes one of the infringing entities and a set of other entities that are potentially affected by the change request; forming a bonded path for a group of propagation scopes that overlap, wherein the bonded path connects selected entities from each propagation scope in the group with one or more common entities in an intersection of the group; and finding a runtime adjustment solution for the group subject to all constraints in which entities of the bonded path participate.

According to another embodiment, a system is provided for performing runtime adjustment of a configuration model. The system comprises: a memory and processing circuitry coupled to the memory. The processing circuitry is adapted to: receive, at runtime, a change request directed at one or more modified entities in the configuration model; identify a set of infringing entities among the one or more modified entities based on leadership information, wherein the leadership information indicates an impact that one entity has on another entity with respect to a given constraint, and wherein the set of infringing entities violate a plurality of constraints in the configuration model; identify a propagation scope for each violated constraint of the plurality of constraints, wherein the propagation scope includes one of the infringing entities and a set of other entities that are potentially affected by the change request; form a bonded path for a group of propagation scopes that overlap, wherein the bonded path connects selected entities from each propagation scope in the group with one or more common entities in an intersection of the group; and find a runtime adjustment solution for the group subject to all constraints in which entities of the bonded path participate.

According to yet another embodiment, a system is provided for performing runtime adjustment of a configuration model. The system comprises: a receiver module adapted to receive, at runtime, a change request directed at one or more modified entities in the configuration model; a first identifying module adapted to identify a set of infringing entities among the one or more modified entities based on leadership information, wherein the leadership information indicates an impact that one entity has on another entity with respect to a given constraint, and wherein the set of infringing entities violate a plurality of constraints in the configuration model; a second identifying module adapted to identify a propagation scope for each violated constraint of the plurality of constraints, wherein the propagation scope includes one of the infringing entities and a set of other entities that are potentially affected by the change request; a path building module adapted to form a bonded path for a group of propagation scopes that overlap, wherein the bonded path connects selected entities from each propagation scope in the group with one or more common entities in an intersection of the group; and a solution finding module adapted to find a runtime adjustment solution for the group subject to all constraints in which entities of the bonded path participate.

BRIEF DESCRIPTION OF THE DRAWINGS

FIGS. 3A and 3B illustrate the relation between entities of a domain model according to one embodiment.

FIG. 9 illustrates a system for performing runtime configuration adjustment according to one embodiment.

FIG. 10 illustrates a computer system for performing runtime configuration adjustment according to one embodiment.

DETAILED DESCRIPTION

Figure 1:
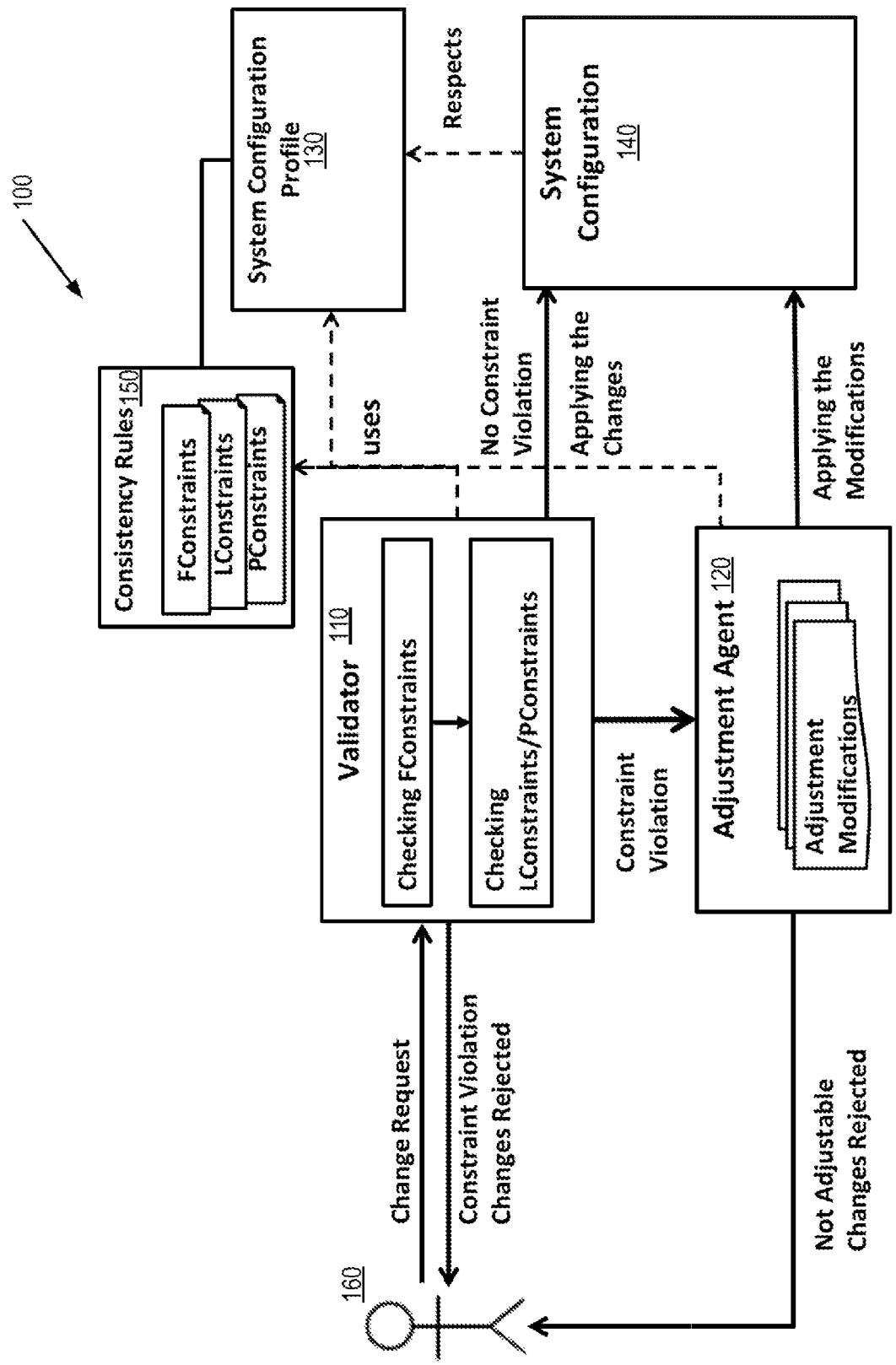
FIG. 1 illustrates a model based framework for managing changes to a system configuration according to one embodiment.

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

In some alternate implementations, the functions/acts may occur out of the order noted in the sequence of actions. Furthermore, in some illustrations, some blocks may be optional and may or may not be executed.

In order to resolve inconsistencies caused by incomplete runtime changes to a system configuration, an approach is described herein for completing the incomplete set of changes and adjusting automatically configurations at runtime. The runtime adjustment consists of modifications to other entities or attributes to re-establish the configuration consistency. These modifications are referred to as the "complementary modifications" as they complete the initial partial change set.

The system described herein is a self-adaptive system, as it can adjust itself to changes during runtime. However, finding a proper set of complementary modifications in response to requested changes is sometimes non-straightforward. One reason is that these modifications are affecting other configuration entities, which are themselves involved in other constraints that may potentially be violated by the complementary modifications. Thus, the initial changes can propagate throughout the configuration and affect other configuration entities up to the point that the constraints are all satisfied or all entities have been considered and no solution is found. Such a change propagation process may result in changing a large number of entities. It is not desirable to change a large number of entities because the configuration is a representation of the real system and any changes in the configuration are applied on real system entities. Thus, it is a good practice to keep the modifications minimal so as not to destabilize the system.

Moreover, to best serve the system requirements, the initial configuration is often designed and generated with optimization in mind, resulting in specific values for the different entities. Finding new values for such entities through change propagation may provide a valid configuration but may not preserve the optimization or configuration designer's preferences anymore. To avoid unwanted changes as such, it is better to keep the change propagation minimum and modify the minimal set of entities. That is, the complementary modifications are minimized whenever possible.

Embodiments of the invention provide a model-based approach for automating the adjustment of configurations at runtime. The adjustment approach is defined with respect to the system constraints and the impact of the system entities on each other. To reduce the number of complementary modifications, a propagation scope for solving each violated constraint is defined with respect to "leadership," which describes the impact that the system entities may have on each other. The leadership concept is defined based on the relations and dependencies between the configuration entities and their attributes. It reflects that some entities and attributes have dominant or leader role toward others, the followers. These roles will be explained in more detail in the following description. The leadership concept can be used to direct an incremental propagation, which is established to reduce the number of modified entities and avoid affecting entities unnecessarily.

In some embodiments, the initial changes are proposed as a bundle, in contrast to a single entity change. These changes may violate multiple constraints. The change propagation for solving each violated constraint results in modification of certain entities that might also be impacted from the propagation of another violated constraint. Such related changes are solved together. After determining the propagation scopes and identifying the entities to be modified, the problem of maintaining the system consistency can be formulated as a Constraint Satisfaction Problem (CSP) and solved by a constraint solver to find the valid complementary modifications for runtime adjustment of the system configuration.

A model-based framework for configuration change management is presented in the following description. A system configuration is a logical representation of system resources, their relations and dependencies. For the representation and manipulation of configurations, a configuration schema is usually used to specify the correct structure of the configuration entities, their relations and the constraints. To be valid and consistent, a configuration respects its schema regarding the structural and semantic constraints of the schema. A system reconfiguration may happen for various reasons such as in response to environment change, or users' requests for fine-tuning. These changes may violate the consistency of the configuration, and a system can reject changes that cause such violations, or adjust to the changes by making complementary modifications to the system configuration.

FIG. 1 illustrates a model based framework 100 for managing changes to a system configuration 140 according to one embodiment. The framework 100 includes a configuration validator 110 to validate the change requests submitted by an administrator or management applications 160. The framework 100 also includes an adjustment agent 120 that finds complementary modifications, if any exist, to resolve the potential inconsistencies detected in the validation phase. In one embodiment, the system configuration 140 may be validated by the validator 110 using a partial validation approach, which prunes unnecessary constraints and thus reduces the cost and time of validation. The result of the partial validation may be used by the adjustment agent 120, which, whenever possible, automatically adjusts the configuration in case of detecting constraint violations.

The system configuration model used for the configuration change management is briefly explained below. In one embodiment, the Unified Modeling Language (UML) and its profiling mechanism are used to capture the concepts and relations of the system configuration 140 in a system configuration profile 130. System constraints, in the form of consistency rules 150, are added to the profile 130 as Object Constraint Language (OCL) constraints. The relations and dependencies between the configuration entities or attributes indicate that some of them have a determining role and lead the others especially during configuration changes. In one embodiment, the constraints may be enriched by adding the leadership information to express the way the constrained entities may impact each other. More specifically, the leader, follower, and peer roles are defined for the constrained entities to indicate the influence of the entities on each other, e.g., in a constraint the leader entities have influence over the other follower entities. In other constraints, peer entities have equal effect on each other.

An example explaining the leadership concept and constraints is provided below, before further details of FIG. 1 is described. The example uses the Open Virtualization Format (OVF) to further explain the leadership concept. OVF is a packaging standard defined by the Distributed Management Task Force (DMTF). OVF introduces an extensible format to describe the packaging and distribution of software products (appliances) for virtual systems.

Figure 2B:
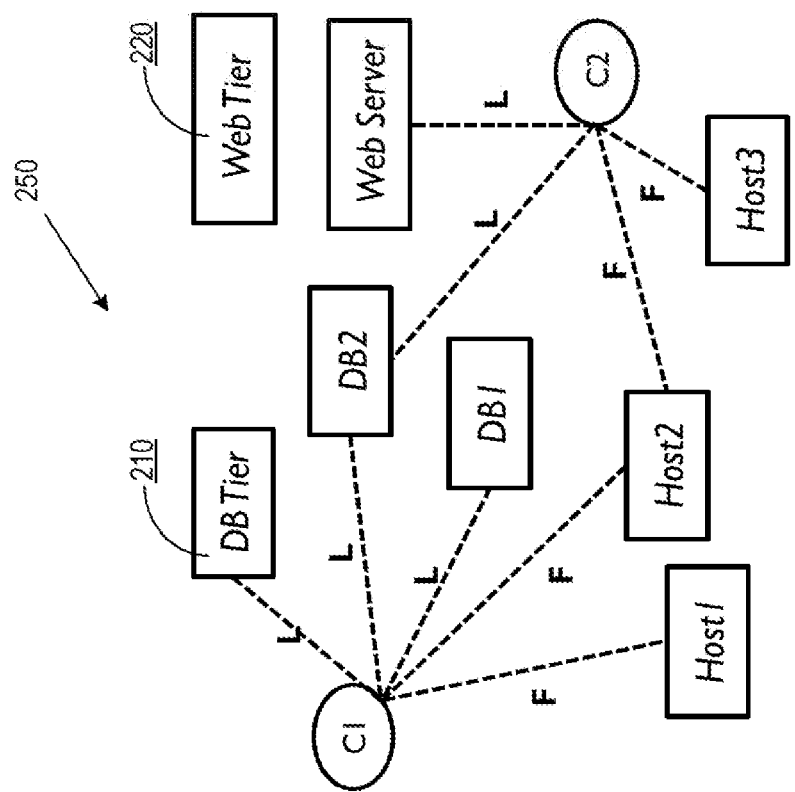
FIG. 2B illustrates another representation of the model of FIG. 2A based on the leadership information defined for constrained entities according to one embodiment.
Figure 2A:
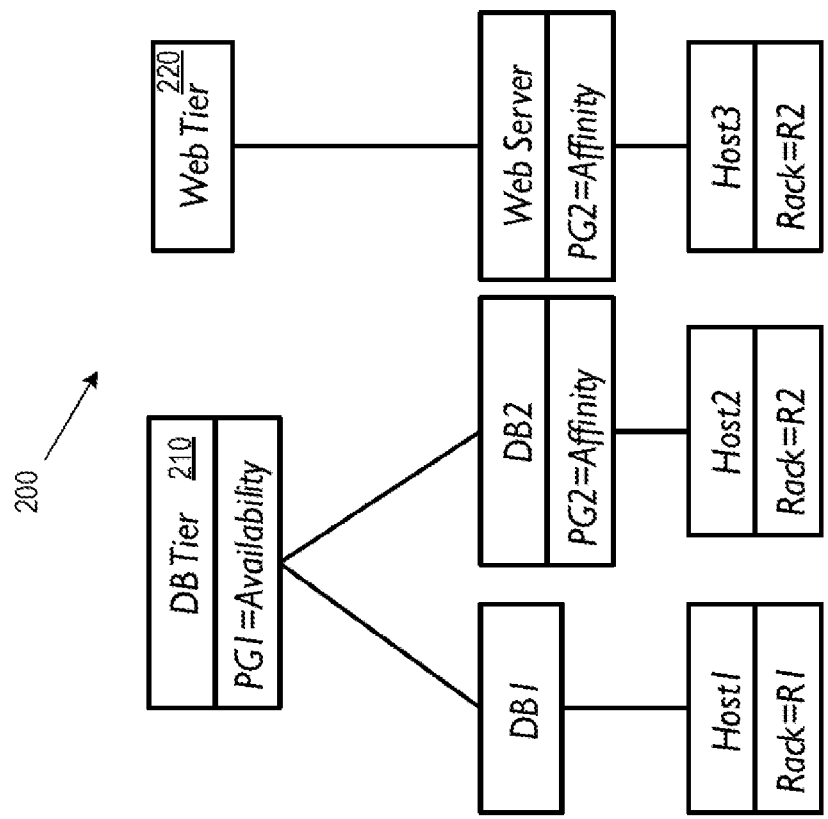
FIG. 2A illustrates a configuration model of a two-tier appliance according to one embodiment.

FIG. 2A illustrates a simple configuration model 200 of a two-tier appliance that consists of a Web Tier 220 with a Virtual System (Web Server) and a DB Tier 210 with two Virtual Systems (DB1 and DB2) according to one embodiment. The OVF package definition allows for the specification of proximity requirements for the deployment of Virtual Systems in a given scope (e.g., host, rack, etc.) through the definition of Placement Group policies for the Virtual Systems and Virtual System Collections:

Affinity Policy:

It is used to specify that two or more Virtual Systems are deployed closely together.

Availability Policy:

It is used to specify that two or more Virtual Systems are deployed separately.

In the model 200 shown in FIG. 2A, the DB Virtual Systems (DB1 and DB2) are to be deployed on hosts that are on different physical racks for fault tolerance. Thus, the placement group (PG) PG1 with the "Availability" policy is specified for the Virtual System Collection of the DB Tier 210; it is shown as a property of the DB Tier 210. On the other hand, the DB2 and Web Server Virtual Systems are to be deployed on hosts which are in the same physical rack for fast communication, so the placement group PG2 with the "Affinity" policy is specified for these two Virtual Systems shown as a property of each the DB2 and the Web Server Virtual Systems.

FIG. 2B illustrates another representation 250 of the configuration model 200 based on the leadership information defined for constrained entities, according to one embodiment. Before describing the representation 250, it is helpful to first describe FIG. 3A and FIG. 3B, in which the concept of constraints is introduced and the relation of leader/follower entities in a constraint is explained.

FIGS. 3A and 3B illustrate the relation between the entities of a simplified OVF domain model 300 according to one embodiment. In FIG. 3B, the domain model 300 is an instance of the configuration profile 130 of FIG. 1. In FIG. 3A, a set of restrictions 310 are shown as an example of the constraints added to the domain model 300. The restrictions 310 are an instance of the consistency rules 150 of FIG. 1. The configuration model 200 of FIG. 2A is a configuration model instance of the domain model 300. The configuration model 200 has to be consistent with the domain model 300 and its consistency is checked by applying the restrictions 310 to its entities. In this example, the restrictions 310 that the Placement Group policies impose on the deployment of Virtual Systems are expressed with the OCL constraints in FIG. 3A. However, an OCL constraint does not capture the impact of the constrained entities on each other; e.g., the Virtual Systems and the Virtual System Collections (including their PGs) are the dominant entities in the C1 and C2 OVF domain constraints. This means that these entities determine which Hosts are eligible for the deployment, and force a change to the deployment if the constraints are not satisfied. Thus, the Virtual System and Virtual System Collection entities have the leader role and drive the Host entity, which is the follower. This means that if the PG attribute of the Virtual System entity changes and the constraint is violated due to this change, the Host of the Virtual System is to be changed accordingly, to follow the Virtual System change and satisfy the constraint (e.g., by picking a new host in an eligible rack). On the other hand, if the Host of the Virtual System changes (e.g., when the Host is moved to another rack, when the Host fails or is removed from the system, etc.) and this change violates the constraint, the Virtual System and its Placement Group Policy cannot be changed as the role semantics does not allow the leader entity to adjust to the changes of the follower entities. As a consequence the Virtual Systems cannot be deployed in the latter case.

Referring back to FIG. 2B, in the representation 250, the constraints are represented by ovals and the entities by rectangles. The participation of each entity in a constraint is captured with an edge between the constraint and the constrained entity. The role of the entity in the constraint is shown as a label on this edge (e.g., label "L" represents the Leader role, label "F" represents the Follower role and label "P", not illustrated, represents the Peer role). This representation 250 is used in the rest of the description as it focuses on the role of entities in the constraints and depicts how the constrained entities can affect each other. Although the constraints are applied on all the entities of the same context (e.g., Constraint C1 is applicable on both DB Tier 210 and Web Tier 220), for the sake of simplicity FIG. 2B only shows the relation of the constraints to the entities where the constraints can be checked. For example, constraint C1 is not shown for Web Tier 220 because the PG attribute of the Web Tier 220 does not have a value C1, so there is no need to check C1 for the Web Tier 220.

Referring again to FIG. 1, in one embodiment, the constraints can be categorized based on the role of changed entities in the constraints. Three sets of constraints, LConstraints, FConstraints and PConstraints (shown in FIG. 1 as the consistency rules 150), can be created. The validator 110 starts the validation by checking the most restrictive category, i.e., FConstraints. If a violation occurs in FConstraints, the validation is stopped and the changes are rejected. This is because the FConstraints set collects the constraints for the changes of follower entities only, and follower entities cannot impact the leader entities. On the other hand, a violation of LConstraints and/or PConstraints still allows for the adjustment of the changed configuration by modifying the respective follower or peer entities of the LConstraints or PConstraints. After validating the FConstraints, the validator 110 checks the LConstraints and PConstraints. If no constraint violation is found, the requested changes are applied to the system configuration 140. If any constraint violation is found, the adjustment agent 120 will use the leadership information defined in the consistency rules 150 to determine whether an adjustment can be made to the system configuration to resolve the violation. If valid modifications can be found, the adjustment agent 120 applies the modification to the system configuration 140. Otherwise, the requested changes are rejected.

The consistency of the configuration is to be maintained throughout the system lifecycle to avoid any mal-functioning of the services and applications deploying this configuration. A configuration model is consistent when it satisfies all the structural and semantical rules, i.e., all the constraints of its metamodel (also referred to as profile). The constraints are rules which force special restrictions on related entities of the configuration. To ensure consistency, any reconfiguration is checked against the consistency rules. Thus, if a constraint is violated because of changes in one or more of its constrained entities, the other entities involved in the constraint can be modified to satisfy the constraint, i.e., to complement the proposed changes. In turn, these complementary modifications can cause other inconsistencies as the modified entities may be subject to other constraints. Thus, these newly violated constraints need to be handled as well. The modifications propagate in the configuration model to the point when all the constraints are satisfied (i.e., when the adjustment is successful), or no further modification is possible while still some constraints are not satisfied (i.e., when no successful adjustment is possible) and the change is rejected.

The adjustment process is defined as a set of complementary modifications and, if necessary, the propagation of these modifications in the model to find a solution which satisfies all the constraints. Thus, a solution includes some entities of the configuration model with new values that along with the other entities of the model satisfy all the constraints. In this sense, two steps of the adjustment can be considered: the first step is to identify the scope of changes (i.e., what entities of the model may need to be modified); and the second step is to modify as few entities as possible in the scope in such a way that satisfies all the constraints (i.e., how the modifications are to be made). One approach is to first identify the propagation scope for each invalid change by collecting all the entities that can be affected by the invalid change, then to modify a minimum subset of this scope to satisfy the violated constraints. For this purpose, the modifications are propagated incrementally and additional entities are selected to be modified in each iteration. Two scenarios are described in the following: (1) the single constraint violation, and (2) the multiple constraint violation.

Before describing the two scenarios, two challenges posed by the automated adjustment of configuration models, which are "change propagation" and "multiple related changes", are explained. Furthermore, the formal definitions of the context and the concepts are presented, and finally the approach for overcoming the challenges is described.

Change propagation. The configurations of large systems consist of thousands of interrelated entities. In such models, an attempt to resolve the violation of a single constraint can result in changes of multiple entities, which in turn may violate other constraints. For instance, in the model 200 shown in FIG. 2A, if the PG attribute of the Web Tier 220 is changed to "Affinity," then C1 constraint is violated. The "Affinity" Placement Group policy of the DB Tier 210 specifies that both DB1 and DB2 are to be on the same Rack; however, the model 200 indicates that DB1 is on Host1 of Rack1 and DB2 is on Host2 of Rack2. To resolve the violation, if DB2 is deployed on a Host of Rack1 (e.g., Host1), then C2 constraint is violated as DB2 and Web Server are constrained to be in the same Rack. However, if DB1 was deployed on a Host of Rack2 (e.g., Host2) then both constraints are satisfied.

The changes may propagate in an exponential manner and finally result in changing a large number of entities. In the worst case, the whole configuration model may be changed. This is not desirable as more changes result in more constraints to be solved, which costs more time and computation. Moreover, more changes in the configuration mean the reconfiguration of more system entities in the running system, as the configuration changes are to be applied on system entities. More reconfigurations in the system, in turn, risk more of the system stability, which is especially undesirable in highly available systems. Thus, it is better to keep the changes minimum and change only the entities that are necessary. The issue is how to limit the change propagation to reduce the number of changes and reduce the cost of changes.

As mentioned earlier, multiple changes may be requested in a change bundle. Some of these changes may violate some constraint(s) that would cause change propagation. The propagation of different changes may overlap in the sense that they may affect the same entities, which makes the resolution of the violation more complicated. On the other hand, the resolution of certain violations may not be made independently and a solution is only possible when the propagations of multiple changes are considered together. The challenge is how to decide when multiple changes are related and how to consider their propagation together.

The model based framework described herein provides a formal definition of the constraints over the stereotypes of the configuration profile. By applying the stereotypes of the profile to the entities of the configuration models, it is ensured that the constraints are also applied to all the instances of those stereotypes. As both the configuration model and the profile are known, the constraints that are applied to the entities of the model can be found. For the sake of simplicity, the constraints are used as part of the configuration model.

In one embodiment, a configuration model is defined as a tuple G=<En, C, Role, f>, where En is a set of configuration entities, and C is a set of configuration constraints; e.g., the constraints for assuring the affinity or availability for virtual systems in the OVF configuration example.

Role is a set of leadership roles for the constrained entities, Role={leader, follower, peer}, and f is a function defined over the cross-product of entities and constraints and which associates a role with an entity in a constraint f: En×C→Role, with the following two constraints:

(1) For any constraint if there is a leader entity then there is at least one follower and there is no peer entity: $\forall c \in C$: $\exists en_x \in En$ with $f(en_x, c)$=leader)⇒$\exists en_y \in En$ with $f(en_y, c)$=follower$^\wedge \nexists en_z \in En$ with $f(en_z, c)$=peer.

(2) For any constraint if there is a peer entity all entities involved in the constraint are peer: $\forall c \in C$: $\exists en_x \in En$ with $f(en_x, c)$=peer⇒$\forall en_y \in En$ with $f(en_y, c) \neq Nil$, f $f(en_y, c)$=peer.

In the following description, the term ChangeBundle is used to denote the initial set of changed entities. The subset of entities of the ChangeBundle that causes violation is referred to as IncompleteChangeSet, which is obtained from the validation phase. The subset of constraints that are violated by the infringing entities is called the ViolatedConstraintSet and it is also obtained from the validation phase. An entity of the IncompleteChangeSet is either a leader or peer entity in the violated constraint because if the entity was a follower, then the change was rejected in the validation phase. Follower entities cannot affect the leader entities and thus there is no possibility for any adjustment.

IncompleteChangeSet={$en_x \in$ ChangeBundle|$\exists c \in C$ with($en_x,c$)=(leader or peer)^c is not satisfied}.ViolatedConstraintSet={$c \in C | en_x \in$ ChangeBundle with($en_x,c$)=(leader or peer)^c is not satisfied}

The SinkSet contains the entities which have only follower or peer role in all the constraints in which they are involved.

SinkSet={$en_x \in En | \forall c_y \in C$ with $f(en_x,c_y) \neq Nil, f(en_x,c_y)$=(follower or peer)}.

Additionally, a binary relation named Compulsion, is defined on the model entities ($en_i$, $en_j \in En$) as follows:

$\forall en_i, en_j \in En, en_i \triangleright en_j \Leftrightarrow (\exists c \in C | f(en_i,c)$=leader$\hat{} f(en_j, c)$=follower)$\hat{}(\exists c \in C | f(en_i,c)$=peer$\hat{} f(en_j,c)$=peer), or $\forall en_i, en_j \in En, en_i \triangleright en_j \Leftrightarrow \exists en_k \in En | en_i \triangleright en_k \hat{} en_k \triangleright en_j$.

The compulsion relation is transitive by definition.

Each entity of the IncompleteChangSet is referred to as an infringing entity. For one infringing entity of each violated constraint, its propagation scope is determined. The propagation scope is basically a slice of the configuration model which contains all the entities and constraints that can be affected by the propagation of the change. The scope is created based on the leadership information according to the compulsion relation between the entities. This means the constraints in which the changed entity is the leader or peer are selected and added to the scope, as well as other entities involved in those constraints. Later if any selected entity has a leader or peer role in other constraints, the propagation continues and the follower or peer entities of those constraints are also selected and added to the scope. The propagation continues until it reaches either the entities that are only followers in all the constraints that they participate, or all the peers of the constraint are already selected.

For one infringing entity ($en_i$) of each violated constraint ($c_i$), a propagation scope PSi=<$E_i$, $C_i$, Role, $f_i$>is defined. The definitions of Role and $f_i$ are the same as the Role and f of the model.

The $E_i$ (i.e., the entity set of the PSi) is defined by accumulating the infringing entity ($en_i$) as well as all the entities which are in Compulsion relation with $en_i$. In other words, all the entities that are followers or peers of the infringing entity directly or indirectly (through other entities and constraints) are gathered in the scope. Thus, the $E_i$ is defined as:

$en_i \in E_i$, and $\forall en_i \in En, en_i \triangleright en_j \Leftrightarrow en_j \in E_i$ The constraint set of the scope $C_i$ includes the constraints in which the entities of the scope are involved including the violated constraint $c_i$.

Path creation in each scope. In each propagation scope, a set of propagation paths can be identified. A path is defined as an ordered set of entities that starts with an infringing entity. The path is created following the compulsion relation between the entities. It ends if the entity is a sink entity in the scope or if it is only leader/peer for entities of the path itself—to avoid cycles. The paths are used for change propagation within each scope.

For an infringing entity $en_i$, a Path$_x$, is an ordered set of entities of the scope PSi (in which $en_i$ is the head of the path) that is defined as follows:

$en_i \in$ Path$_x$,       (1)

$$\forall en_j \in E_i, en_j \in \text{Path}_x, \text{iff } en_i \triangleright en_j, \text{ and } \forall en_k \in \text{Path}_x, (en_k \triangleright en_j) \lor (en_j \triangleright en_k), \quad (2)$$

and $$\exists en_k \in \text{Path}_x \text{ such that } en_k \in \text{SinkSet, or } \exists en_j \in E_i, en_k \triangleright en_j \Rightarrow en_j \in \text{Path}_x \quad (3)$$

The collection of all paths in a propagation scope is called a PathCollection. Besides the first entity, which is common in all paths of a PathCollection, different paths of the PathCollection can have other entities in common as well.

Figure 4:
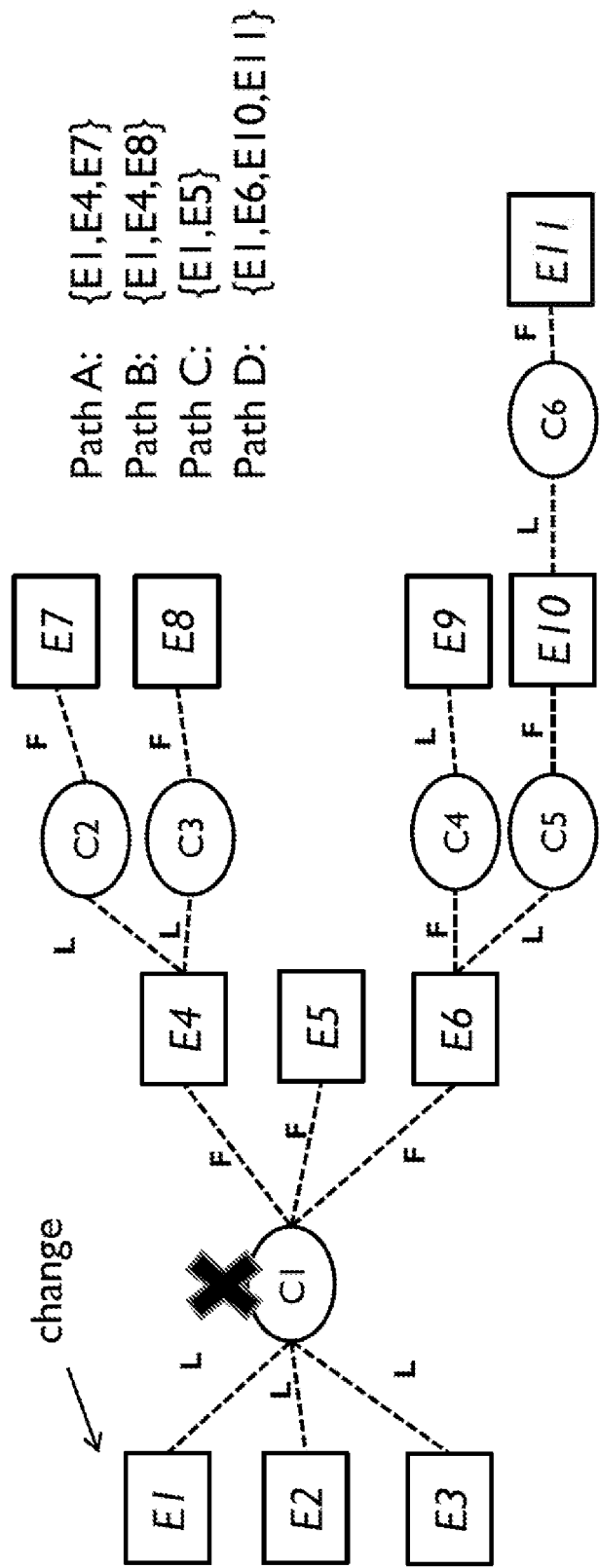
FIG. 4 illustrates multiple paths in a propagation scope for an infringing entity which violates a constraint according to one embodiment.

FIG. 4 illustrates multiple paths in a propagation scope for an infringing entity (E1) which violates constraint C1 according to one embodiment. As E1 is a leader entity in C1, its change can propagate to the follower entities of C1 which results in multiple paths (i.e., Path A, Path B, Path C, Path D). The paths start with E1 and end with an entity with only the follower role, e.g., Path A ends with E7, which is an entity with only the follower role in C2.

An approach for solving single constraint violation is provided in the following description. The use of the propagation scope for an infringing entity of a violated constraint isolates the runtime adjustment problem and ensures that all the entities that may be impacted during change propagation are already gathered in the scope. The problem of a scope can be handled separately if there is only one scope, or in case that the scope does not have any common entities with the other scopes.

A PathCollection of each scope may contain multiple different paths. To find a solution for the infringing entity of the scope (i.e., the complementary changes which satisfies the constraints of the scope), one path at a time is selected. The system (e.g., the adjustment agent 120 of FIG. 1) attempts to find a solution of complementary modifications for the entities of the path. If no solution can be found in the selected path, another path from the PathCollection is selected. The path selection ends when either a solution is found in the selected path or when all the paths are exhausted. If all the paths are exhausted and no solution is found, all the paths of the PathCollection are taken together to find a solution that may change multiple follower entities of different constraints.

Incremental propagation for the shortest path. The paths in the PathCollection can be ordered according to their length. As it is desirable to change the least number of entities, a solution is attempted for the shortest path. In one embodiment, an incremental change propagation is used to select the minimum number of entities in the path for modifications. This means that in each increment, new values are found for a selected follower or peer entity of a violated constraint. In the first increment, the selected entity is the second entity of the path which is subsequent to the infringing entity of the scope. In the second increment, the next entity of the path is selected and so on. Each selected entity, which is not the last entity of the path, participates in two sets of constraints: MandatoryC and RelaxC.

The first set of constraints, MandatoryC, includes the constraints in which the selected entity has a follower role. The set is called MandatoryC because it contains the constraints that are mandatory to satisfy by the change of the selected entity.

The second set of constraints, RelaxC, includes the constraints in which the selected entity has a leader or peer role. This set is called RelaxC. Although the adjustment agent 120 tries to find a change for the selected entity that satisfies the constraints of this set as well, if no solution can be found, the problem can be relaxed by removing these constraints. This is because the selected entity has the leader/peer role in these constraints, and if these constraints are violated, the violation may be resolved in the next increment when the next entity of the path is selected (which is a follower or peer in the constraints of the RelaxC).

In each increment, the purpose is to find a change for the selected entity which satisfies all the MandatoryC and RelaxC. If no solution can be found, the RelaxC constraints are removed to relax the problem. If by removing the RelaxC constraints the problem is solvable, a new increment is added which means that the next entity of the path becomes the selected entity for which the MandatoryC and RelaxC constraints are identified. The propagation stops at any increment where a solution is found. If no solution can be found after removing the RelaxC constraints, the selected path is unsolvable.

Note that the RelaxC is empty in the last increment when the selected entity is the last entity of the path. Thus, only the MandatoryC set needs to be solved in the last increment.

---
Algorithm_1: Incremental Change
Propagation for the Shortest Path
---

Input: PropagationScope, ViolatedConstraint, PathCollection, ConstraintSet
Output: Solution
1:  //Sort the PathCollection based on the length of the paths
2:  Sort(PathCollection[ ])
3:  UnSolvablePath:= False
4:  SolutionFound:=False
5:  MandatoryC:={ViolatedConstraint}
6:  RelaxC:={ }
7:  For (j:=0; j<|PathCollection|&SolutionFound==False; j++)
8:      SelectedPath:= PathCollection[j]
9:      For(i=1; i<|SelectedPath|&UnSolvablePath==False; i++)
10:         entity:= SelectedPath[i]
11:         For each constraint in ConstraintSet
12:             If ( F(entity,constraint) == leader or peer then
13:                 RelaxC:= RelaxC ∪ {constraint}
14:             Else If ( F(entity,constraint) == follower then
15:                 MandatoryC:= MandatoryC ∪ {constraint}
16:             End if
17:         End for
18:         Solution:= Solve(MandatoryC ∪ RelaxC)
19:         If (Solution≠{ })) then
20:             SolutionFound:=True
21:             Return Solution
22:         Else If (Solve(MandatoryC)=={ }) then
23:             UnSolvablePath:= True
24:         Else RelaxC:={ }
25:         End if
26:     End for
27:     MandatoryC:={ViolatedConstraint}
28: End for
29: Solution:= Solve(ConstraintSet)
30: Return Solution Algorithm_1 describes the process of incremental change propagation for the shortest path. The inputs of the algorithm are the ViolatedConstraint, its propagation scope for an infringing entity, and the PathCollection and the ConstraintSet of the propagation scope. And the output is the Solution that is obtained from the constraint solver. First the PathCollection is sorted based on the length of its paths (line 2). Two flags are used to determine the satisfiability of the path and the problem which are UnSolvablePath and SolutionFound respectively. Both are false in the beginning (lines 3, 4). For each path the MandatoryC collects incrementally the constraints that are mandatory to satisfy and RelaxC is the set of constraints that can be relaxed and be handled in the next increment (lines 5, 6). In the beginning MandatoryC has the initially violated constraint (i.e., ViolatedConstraint). The paths of the PathCollection are selected one at a time starting with the shortest until a solution is found for a selected path or reach to the end of PathCollection set (lines 7-28). In each selected path, the process takes the incremental propagation approach by selecting the next entity and considering its constraints from the ConstraintSet (lines 9-17). If the entity has a leader or peer role in some constraints, they will be added to RelaxC set (lines 12, 13) and if the entity is a follower in some constraints, they are added to MandatoryC (lines 14, 15). Then the satisfiability of the constraints is checked. If there is a solution that satisfies the constraints of both MadatoryC and RelaxC sets, then the solution is returned and the flag SolutionFound is set so the other paths would not be traversed for a solution (lines 18-21). Otherwise the MandatoryC constraints are checked without the RelaxC set and if they are not satisfiable (the Solution is empty) that means that no solution can be found in this path so the UnSolvablePath flag is set (lines 22, 23). The other possible case is when the MandatoryC constraints are satisfiable but the RelaxC are not satisfiable. In this case the RelaxC set is emptied (line 24), and the process proceeds to the next increment and it selects the next entity of the path and repeats the same routine till the process reaches the end of the path or finds a solution. If the path is unsolvable, then all the constraints except the Violated Constraint are removed from the MandatoryC set (line 27) and the next path of the PathCollection is selected. After traversing all the paths if no solution is found then the processes tries to find a solution by considering all of them together which means solving the whole ConstraintSet of the scope (lines 29-30).

An approach for solving multiple constraint violation is provided in the following description. Multiple changes that are requested as a change bundle may cause multiple constraint violation. In this case for each violated constraint, one infringing entity is selected, and a propagation scope and PathCollection are calculated. If these propagation scopes are disjoint (i.e., no common entity between them), then each scope is solved individually similar to the single constraint violation. On the other hand, if the propagation scopes have an intersection, the scopes are not to be solved separately. In this case, the change bundle may contain related changes and it may not be possible to find a solution for each scope separately. A solution is possible only when the related changes are considered together as a single problem.

Figure 5:
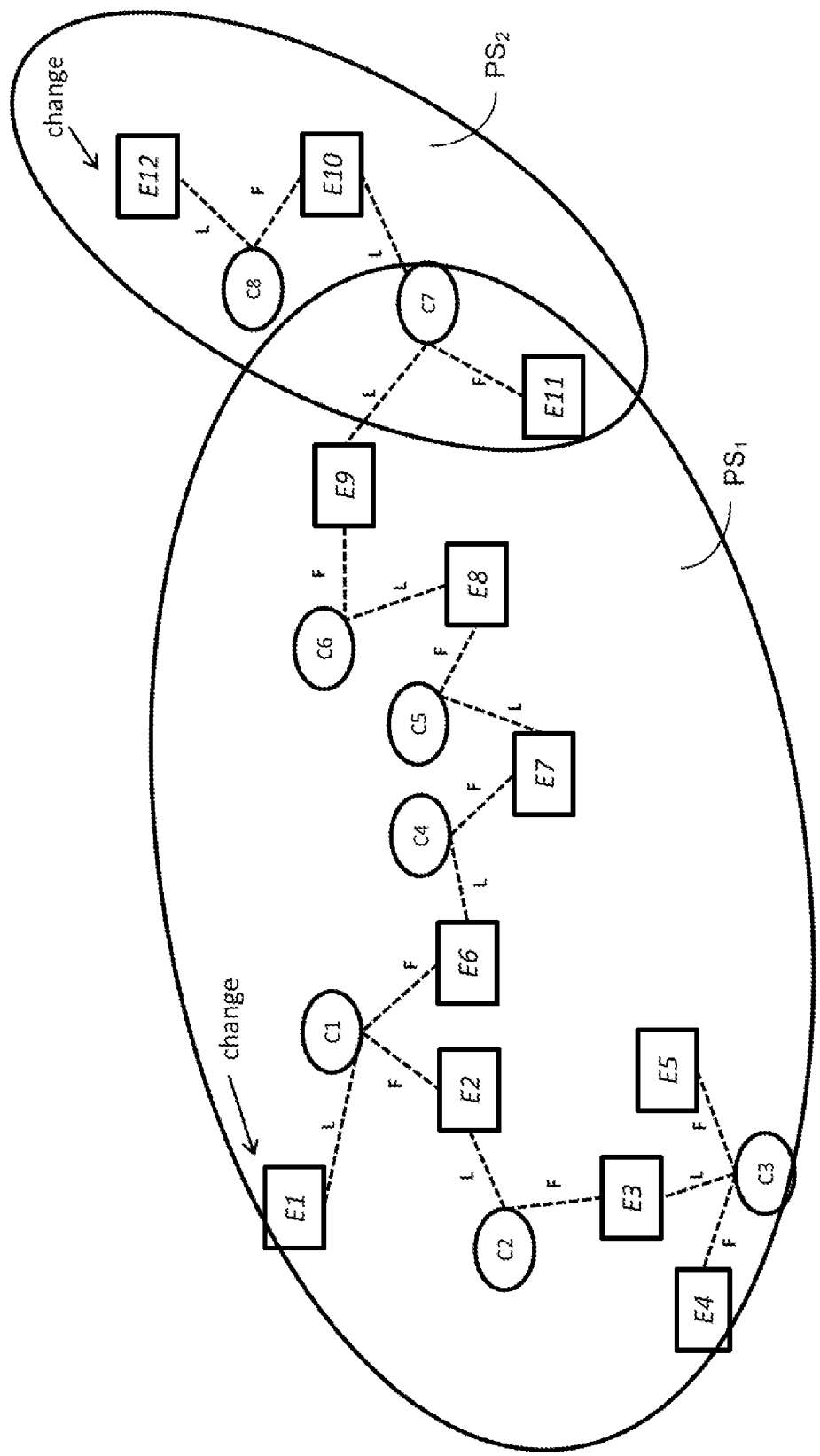
FIG. 5 illustrates an example of overlapping propagation scopes and their intersection according to one embodiment.

FIG. 5 illustrates a model 500, which is an example of overlapping propagation scopes and their intersection according to one embodiment. In the model 500, two entities E1, E12 are infringing entities, each violating one constraint (C1, C8 respectively). For each infringing entity, the propagation scope (PS1, PS2 respectively) and PathCollection are calculated. For PS1 of E1, there are three paths: Path A={E1, E2, E3, E4}, Path B={E1, E6, E7, E8, E9, E11} and Path C={E1, E2, E3, E5}. For PS2 of E10, there is only one path, Path X={E12, E10, E11}. The two scopes PS1 and PS2 have an intersection that contains a common entity E11. As the changes in each of PS1 and PS2 affect the common entity, and both Path B and Path X include the common entity, Path B and Path X are solved together to satisfy the constraints in PS1 and PS2.

Thus, in one embodiment, overlapping scopes are solved together. For this purpose, overlapping scopes are grouped together into a Group. For each Group, an Intersect captures the common entities of the overlapping scopes. The Groups are disjoint (i.e., they have no common entities) as the overlapping scopes are collected in the same Group.

Figure 6:
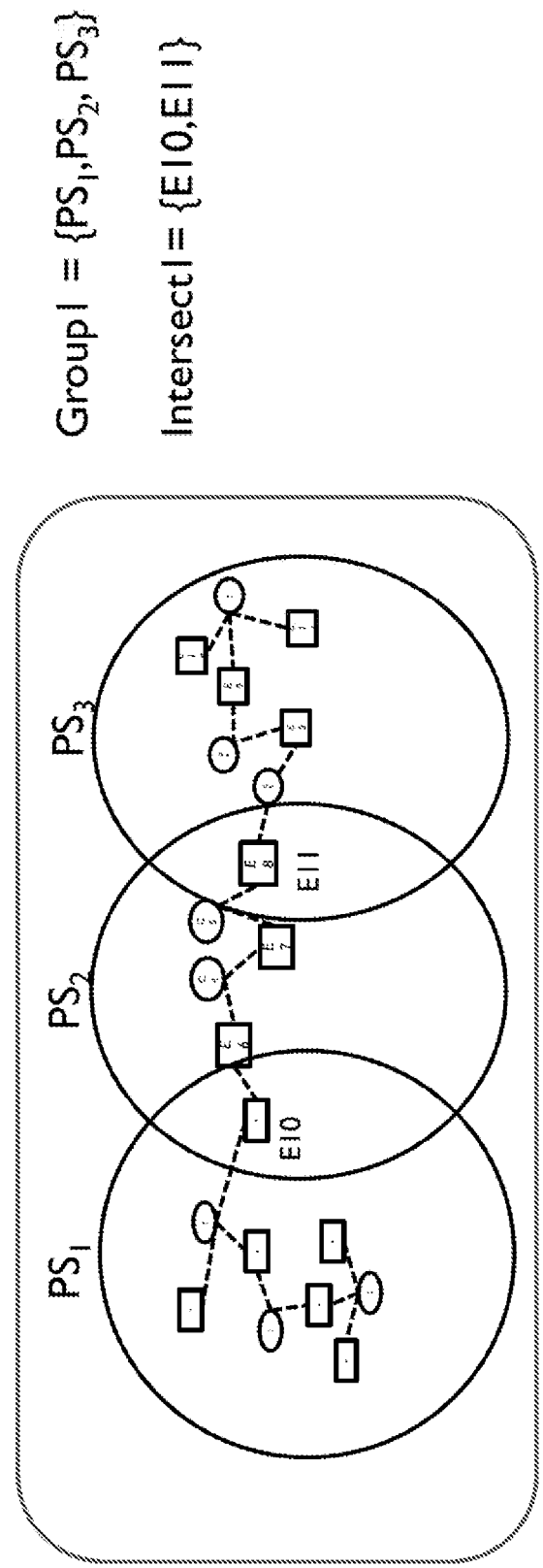
FIG. 6 illustrates an example of overlapping propagation scopes and their intersection according to another embodiment.

FIG. 6 illustrates a model 600, which is an example of partially overlapping propagation scopes according to one embodiment. In the model 600, propagation scopes PS1 and PS2 are overlapped, and propagation scopes PS2 and PS3 are overlapped. Even though the three overlapping propagation scopes have two disjoint overlapping regions, these three scopes are considered as one group and are grouped together into Group 1. The Intersection of Group 1, which is called Intersect1, contains all of common entities in the two overlapping regions. In this example, Intersect1={E10, E11}.

Furthermore, the GroupSet is the collection of the Groups and the IntersectSet is the collection of the Intersects of the Groups. The process of forming the Groups of a GroupSet is presented in the following description.

In one embodiment, each of the scopes is compared with the Groups of the GroupSet. If the scope has common entities with a Group, the scope is added to the Group and the Intersect of the Group is updated accordingly with the common entities. If a scope cannot be added to any of the existing Groups, a new Group is created with an empty Intersect (i.e., how the first Group is formed).

---

Algorithm_2: Grouping the overlapping scopes

Input: PropagationScopeCollection,
Output: GroupSet, IntersectSet
1:   // Grouping the overlapping scopes
2:   GroupSet := { }
3:   IntersectSet := { }
4:   For each $PS_i$ in PropagationScopeCollection
5:      K := −1
6:      For (j:=0; j<|GroupSet|;j++)
7:         If ($E_{psi} \cap E_{Groupj} \neq \{\}$) then
8:            If (K == −1)
9:               $Intersect_j := Intersect_j \cup (E_{psi} \cap E_{Groupj})$
10:              $Group_j := Group_j \cup PS_i$
11:              K:=j
12:           Else ///$PS_i$ is already added to Groupk
13:              $Group_k := Group_k \cup Group_j$
14:              $Intersect_k := Intersect_k \cup Intersect_j \cup (E_{psi} \cap E_{Groupj})$
15:              Delete $Group_j$
16:              Delete $Intersect_j$
17:              j−−
18:           End if
19:         End if
20:      End for
21:      // If $PS_i$ has no intersection with the groups, create a new group with the PSi and an empty intersection for that
22:      If (K==−1) then
23:         GroupSet := GroupSet $\cup$ {$PS_i$}
24:         IntersectSet := IntersectSet $\cup$ { }
25:      End if
26:   End for
27:   Return GroupSet, IntersectSet

---

Algorithm_2 describes how the Groups are formed with overlapping scopes. The input of the algorithm is the collection of all propagation scopes (i.e., PropagationScopeCollection) and the outputs are the GroupSet and IntersectSet. At the beginning both GroupSet and IntersectSet are empty (lines 2, 3). Each propagation scope is compared with the groups of the GroupSet to find out the Group with which it has common entities (lines 4-18). An integer variable K is used to keep track of the addition of the scope to a Group (K keeps the index of that Group). At the beginning K is set to value (−1) for the scope (line 5). If a Group with common entities with the scope is found and the scope has not been added yet to a group (i.e. K=−1), the scope is added to the Group and the common entities are added to the Intersect of the Group and K is set to the index of the Group (lines 6-12). After adding the scope to a Group, it is also checked if the scope has common entities with other groups of the GroupSet. Such groups are merged with the Group to which the scope has been added and also the Intersect is updated as needed. The merged Groups and their Intersects are deleted. (lines 12-18). After checking all the Groups, if the K is still −1, i.e. no Group can be found which has common entities with the scope, then a new Group is created with the scope and with empty Intersect (lines 22-25). The group finding procedure is repeated for each scope, and finally the calculated GroupSet and IntersectSet are returned as the output (line 27).

Bonding the related paths of each group. Once the related scopes are grouped, and the respective Groups are created, the system (e.g., the adjustment agent 120 of FIG. 1) tries to solve each Group separately. If a Group contains a single scope, it can be solved as a single constraint violation through incremental change propagation for the shortest path. Otherwise, to avoid changing all entities of a Group and reduce the number of changed entities, the adjustment agent 120 proceeds as follows: In each Group the paths which have common entities with the Intersect of the Group are selected to form the BondedPath of the Group. In other words, the related paths are bonded and the other paths which do not have common entities with the Intersect of the Group are disregarded. The entities of the bonded paths of each Group are the primary candidates for the complementary modifications.

Initial changes that are related to each other are requested in the same change bundle. Thus, when potential inconsistencies are detected for a requested change bundle, there is a high chance that the solution is possible only by considering the related scopes together. Grouping the scopes and bonding their paths provides such a solution if it exists.

Similarly to the single constraint violation, for each entity in the BondedPath, the mandatory constraints (MandatoryC) need to be identified and satisfied by the complementary changes. The MandatoryC in this case contains all the constraints in which the entities of the BondedPath are participating (as leader, follower or peer). Unlike in case of the single constraint violation, the incremental propagation cannot be performed; thus, there is no need for the RelaxC. The adjustment agent 120 of FIG. 1 tries to find a solution by considering the BondedPath of a Group. If no solution can be found that satisfies all the constraints in MandatoryC, then the other paths of the Group are considered as well. Algorithm_3 describes a process for the path bonding and finding the solution for multiple-constraint violation.

| Algorithm_3: Bonding the related paths and its resolution |
|---|
| Input: PathCollectionSet, Group, Intersect, IncompleteChangeSet, ConstraintSet |
| Output: Solution |
| 1:    Solutions:={ } |
| 2:    BondedPath:={ } |
| 3:    MandatoryC:={ } |
| 4:    // Bonding the related paths of each Group |
| 5:    For each $en_j$ in IncompleteChangeSet && $Group_i$ |
| 6:       For each $path_k$ in $PathCollection_j$ |
| 7:          If ($path_k \cap$ Intersect$\neq$ { }) then |
| 8:             BondedPath:=BondedPath $\cup$ $path_k$ |
| 9:          End if |
| 10:      End for |
| 11:   End for |
| 12:   //Identifying the constraints related to the entities of the bonded path |

| Algorithm_3: Bonding the related paths and its resolution (continued) |
|---|
| 13:   For each $en_x$ in BondedPath |
| 14:      For each $c_y$ in ConstraintSet |
| 15:         If ( $f(en_x, c_y) \neq$ Nil) then |
| 16:            MandatoryC:= MandatoryC $\cup$ $\{c_y\}$ |
| 17:         End if |
| 18:      End for |
| 19:   End for |
| 20:   Solution:=Solve(MandatoryC) |
| 21:   If (Solution$\neq$ { }) then |
| 22:      Return Solution |
| 23:   Else |
| 24:      MandatoryC:={ } |
| 25:      For each $en_x$ in $E_{groupi}$ |
| 26:         For each $c_y$ in ConstraintSet |
| 27:            If ( $f(en_x, c_y) \neq$ Nil) then |
| 28:               MandatoryC:= MandatoryC $\cup$ $\{c_y\}$ |
| 29:            End if |
| 30:         End for |
| 31:      End for |
| 32:      Solution:=Solve(MandatoryC) |
| 33:   End if |
| 34:   Return Solution |

The Group, its PathCollectionSet, its Intersect, its ConstraintSet and the IncompleteChangeSet are the input of the algorithm and the output is the Solution for the group. For the given Group, the BondedPath, the MandatoryC and the Solution are initialized at the beginning (lines 1-3). A BondedPath is calculated for the Group i.e., for each infringing entity of the IncompleteChangeSet, which also belongs to the Group (line 5). The process selects the paths from its PathCollectionSet that has common entities with the Intersect of the Group (line 6). The identified paths are added to the BondedPath of the Group (lines 6-10).

Next the constraints related to the entities of the BondedPath are added to MandatoryC (lines 13-19). A solution for the Group satisfies all the MandatoryC constraints (line20). If such a solution exists (Solution is not empty), it is returned as the output, i.e., the ultimate solution for the Group (lines 21, 22). If the BondedPath is not satisfiable (Solution is empty) then all the paths of the Group are considered and all the constraints of the Group are added to MandatoryC (lines 23-31). The result of solving the MandatoryC is the solution of the Group (line 32). If the constraints of the MandatoryC are satisfiable the Solution is not empty, otherwise the Solution is empty. In either case the Solution is returned as the output of the algorithm (line 34).

After calculating the scopes and grouping the related ones together, a decision is made as to how to solve each of them. This means that the adjustment agent 120 decides which method (incremental change propagation or the bonded path) is suitable for each group. This decision is made based on the number of scopes in each group.

| Algorithm_4: Overall approach to the adjustments |
|---|
| Input: PathCollectionSet, GroupSet, IntersectSet, IncompleteChangeSet, ConstraintSet, ViolatedConstraintSet |
| Output: Solution |
| 1:  Solutions:={ } |
| 2:  For each $Group_i$ in GroupSet |
| 3:     PartialSolution:={ } |
| 4:     ScopeNumber:=0 |
| 5:     ViolatedConstraint:={ } |
| 6:     // Count the number of scopes in the group |
| 7:     For each $scope_j$ in $Group_i$ |
| 8:         ScopeNumber++ |

| Algorithm_4: Overall approach to the adjustments |
| --- |
| 9:     End for |
| 10:    // Incremental Propagation is called for a group with a single scope |
| 11:    If (ScopeNumber==1) then |
| 12:         ViolatedConstraint:= Select (scope$_j$, ViolatedConstraintSet) |
| 13:         PartialSolution:= IncrementalPropagation (PropagationScope$_j$, ViolatedConstraint, PathCollection$_j$, ConstraintSet$_i$) |
| 14:    //Multiple scopes are solved by Path Bonding |
| 15:    Else |
| 16:         PartialSolution:= BondingPath (PathCollectionSet, Group$_i$, Intersect$_i$, IncompleteChangeSet, ConstraintSet$_i$) |
| 17:    End if |
| 18:    If (PartialSolution ≠{ }) then |
| 19:         Solution:=Solution ∪ PartialSolution |
| 20:    Else |
| 21:         Solution={ } |
| 22:         Return Solution |
| 23:    End if |
| 24:  End for |
| 25:  Return Solution |

Algorithm_4 describes the overall approach to the adjustments, which includes the incremental propagation method (Algorithm_1) and the path bonding method (Algorithm_3). The inputs of the algorithm are PathCollectionSet, GroupSet, IntersectSet, IncompleteChangeSet, ConstraintSet, and the ViolatedConstraintSet. The algorithm tries to solve each Group in the GroupSet resulting in a PartialSolution. The final Solution for the incomplete change set is the union of the non-empty PartialSolutions of all Groups or it is empty. Thus the output is empty if not all the Groups are solvable, otherwise it contains the complementary changes for adjusting the configuration model. The algorithm starts by initializing the Solution as an empty set (line 1). For each Group in the GroupSet a PartialSolution and the ScopeNumber are initialized (line 3, 4). Then the number of scopes is calculated for the Group (lines 7-9). If there is only one scope in the Group then the incremental change propagation method is used for solving the Group (lines 11-14). If there is more than one scope in the Group then the path bonding method is called to solve the Group (lines 15-17). In either case the PartialSolution of the Group is obtained. If the PartialSolution is not empty (i.e. the Group is solvable) then the returned PartialSolution is added to the final Solution (lines 17-19) and the procedure repeats for the next Group. If the PartialSolution is empty it means that the Group is not solvable and thus there is no final Solution (lines 20-23). The reason is that a Solution is only complete when all the Groups of the GroupSet are solved. Even if one Group in unsolvable, it means that no complete Solution exists and the adjustment is not possible, as there are no complementary changes resolving the violations caused by the infringing entities of the Group. At the end, if all Groups in the GroupSet are solvable, the ultimate Solution is returned (line 25) containing all the complementary changes needed for the adjustment.

It is noted that if no complete Solution exists and the adjustment is not possible, all requested changes to the entities in the ChangeBundle are rejected. On the other hand, if all Groups in the GroupSet are solvable and the ultimate Solution is found, the requested changes to the entities in the ChangeBundle are accepted and applied to these entities, and the adjustment (found in the ultimate Solution) is also applied to the other entities affected by the requested changes.

Figure 7:
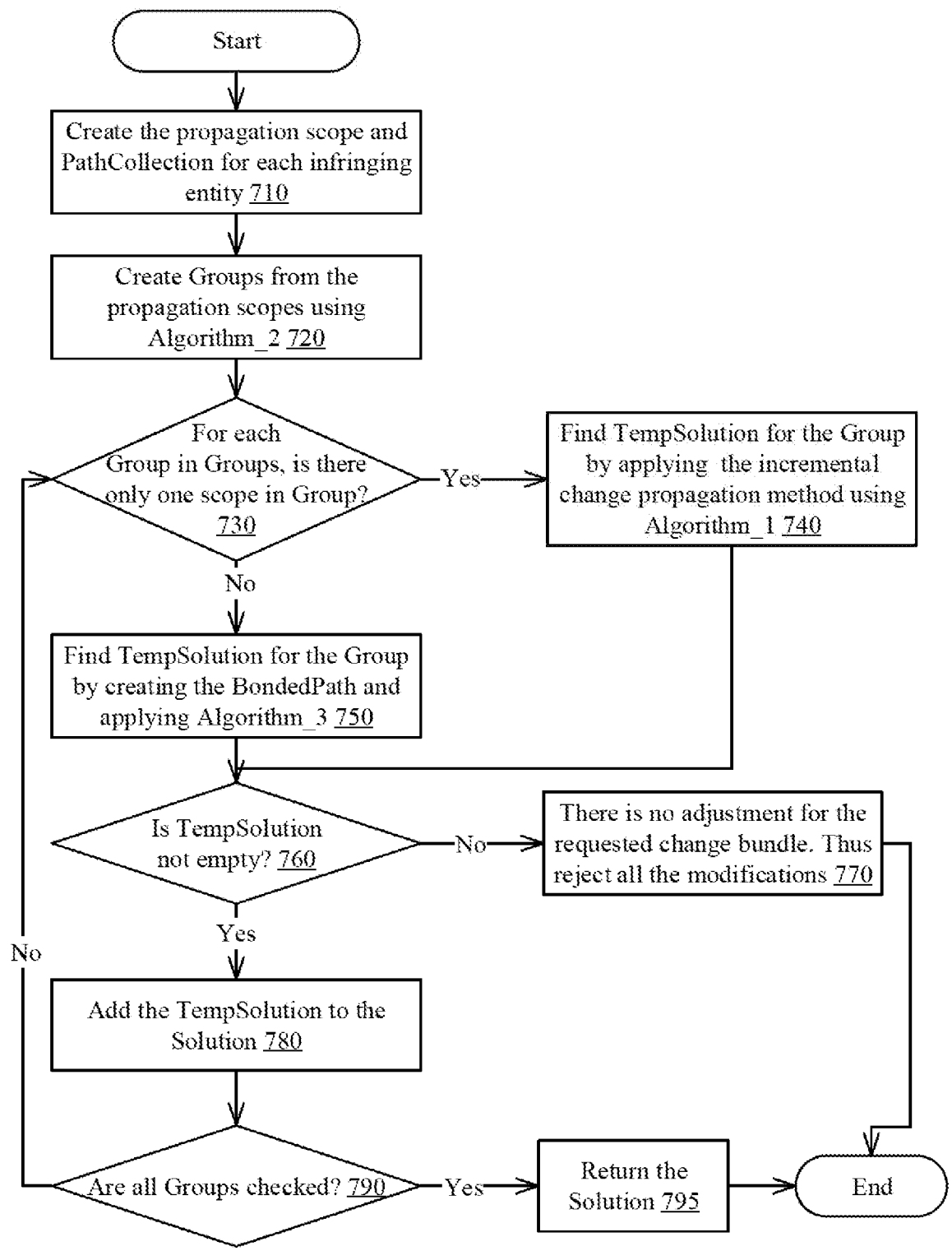
FIG. 7 is a flow diagram illustrating a method of an overall approach for runtime configuration adjustment according to one embodiment.

FIG. 7 is a flow diagram illustrating a method 700 of an overall approach for runtime configuration adjustment according to one embodiment. The method 700 begins by creating a propagation scope and PathCollection for an infringing entity of each violated constraint at step 710. At step 720, Algorithm_2 is used to create Groups from the propagation scopes. For each Group in Groups, the method 700 determines whether the Group includes only one propagation scope at step 730. If the Group includes only one propagation scope, the method 700 uses Algorithm_1 to find TempSolution for the Group at step 740 by applying the incremental change propagation method described in Algorithm_1, and proceeds to step 760. If the Group includes only one propagation scope, the method 700 uses Algorithm_3 at step 750 to find TempSolution for the Group by creating the BondedPath, and proceeds to step 760. At step 760, if TempSolution is empty, it means that no adjustment exists for the requested change bundle. Thus at step 770 all the modifications are rejected and the method 700 ends. If at step 760 TempSolution is not empty, the TempSolution is added to the Solution at step 780, and the method 700 proceeds to determine whether all Groups have been checked at step 790. If all groups have been checked at step 790, the method 700 returns the Solution at step 795 and ends. If not all groups are checked at step 790, the method 700 returns to step 730 until all groups are checked, at which point the method 700 returns the Solution at step 795 and ends.

Figure 8A:
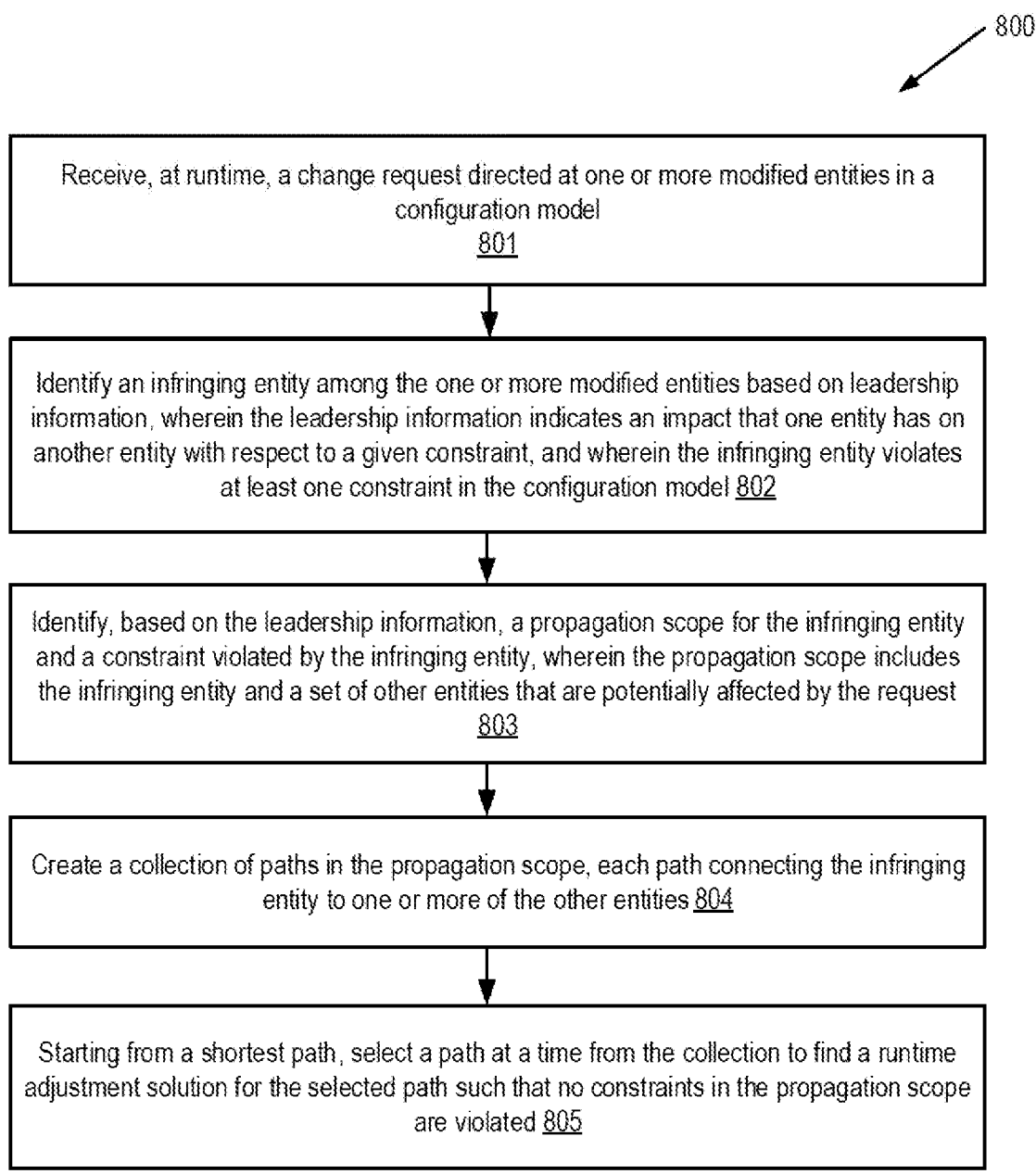
FIG. 8A is a flow diagram illustrating a method for runtime configuration adjustment according to one embodiment.

FIG. 8A is another flow diagram illustrating a method 800 for runtime adjustment of a configuration model of a system according to one embodiment. The method 800 may be performed for resolving single constraint violation. The method 800 begins at step 801 when the system receives, at runtime, a request with one or more modified entities in a configuration model. In the formal definition provided above, the "one or more modified entities" are the ChangeBundle, which is the initial set of changed entities. At step 802, an infringing entity is identified among the one or more modified entities based on leadership information, wherein the leadership information indicates an impact that one entity has on another entity with respect to a given constraint, and wherein the infringing entity violates at least one constraint in the configuration model. At step 803, based on the leadership information, a propagation scope is identified for the infringing entity and a constraint violated by the infringing entity, wherein the propagation scope includes the infringing entity and a set of other entities that are potentially affected by the request. At step 804, a collection of paths are created in the propagation scope, each path connecting the infringing entity to one or more of the other entities. At step 805, starting from a shortest path, a path is selected at a time from the collection to find a runtime adjustment solution for the selected path such that no constraints in the propagation scope are violated.

Figure 8B:
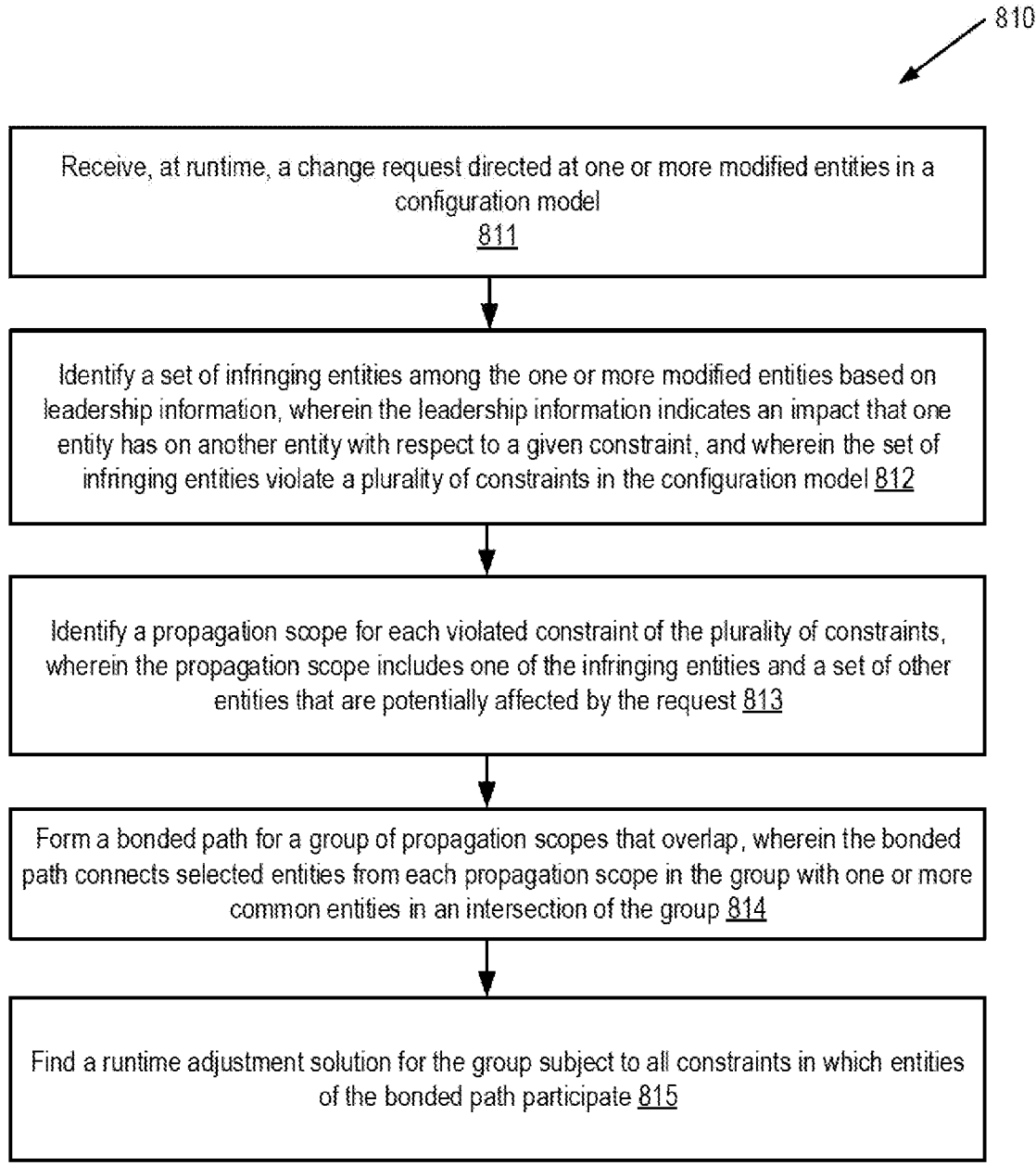
FIG. 8B is a flow diagram illustrating a method for runtime configuration adjustment according to another embodiment.

FIG. 8B is another flow diagram illustrating a method 810 for runtime adjustment of a configuration model of a system according to yet another embodiment. The method 810 may be performed for resolving multiple constraint violation. The method 810 begins at step 811 when the system receives, at runtime, a change request directed at one or more modified entities in a configuration model. In the formal definition provided above, the "one or more modified entities" are the ChangeBundle, which is the initial set of changed entities. At step 812, a set of infringing entities is identified among the one or more modified entities based on leadership information, wherein the leadership information indicates an impact that one entity has on another entity with respect to a given constraint, and wherein the set of infringing entities violate a plurality of constraints in the configuration model. At step 813, a propagation scope is identified for each violated constraint of the plurality of constraints, wherein the propagation scope includes one of the infringing entities and a set of other entities that are potentially affected by the change request. At step 814, the system forms a bonded path for a group of propagation scopes that overlap, wherein the bonded path connects selected entities from each propagation scope in the group with one or more common entities in an intersection of the group. At step 815, the system finds a runtime adjustment solution for the group subject to all constraints in which entities of the bonded path participate.

A model-based approach for the runtime adjustment of configurations has been described. The approach can be adopted by a self-adaptive system, which attempts to resolve the potential inconsistencies that are detected during the configuration validation. These inconsistencies which often happen due to incomplete reconfiguration changes can be completed by adding complementary modifications, i.e., runtime configuration adjustments. Moreover, the complementary modifications of the configuration entities are kept to the minimum to reduce the time and computational cost of changes and not to destabilize the system during the changes at runtime.

FIG. 9 illustrates a system 900 for runtime adjustment of a configuration model according to one embodiment. In one embodiment, the system 900 comprises a receiver module 910 adapted or operative to receive, at runtime, a change request directed at one or more modified entities in the configuration model; a first identifying module 920 adapted or operative to identify an infringing entity among the one or more modified entities based on leadership information, wherein the leadership information indicates an impact that one entity has on another entity with respect to a given constraint, and wherein the infringing entity violates at least one constraint in the configuration model; and a second identifying module 930 adapted or operative to identify, based on the leadership information, a propagation scope for the infringing entity and a constraint violated by the infringing entity, the propagation scope including the infringing entity and a set of other entities that are potentially affected by the change request. The system 900 further includes a path building module 940 adapted or operative to create a collection of paths in the propagation scope, each path connecting the infringing entity to one or more of the other entities. The system 900 further includes a solution finding module 950 adapted or operative to select a path at a time, starting from a shortest path, from the collection to find a runtime adjustment solution for the selected path such that no constraints in the propagation scope are violated.

Alternatively or additionally, the receiver module 910 of the system 900 may be adapted or operative to receive, at runtime, a change request directed at one or more modified entities in the configuration model; the first identifying module 920 may be adapted or operative to identify a set of infringing entities among the one or more modified entities based on leadership information, wherein the leadership information indicates an impact that one entity has on another entity with respect to a given constraint, wherein the set of infringing entities violate a plurality of constraints in the configuration model; the second identifying module 930 may be adapted or operative to identify a propagation scope for each violated constraint of the plurality of constraints, wherein the propagation scope includes one of the infringing entities and a set of other entities that are potentially affected by the change request; the path building module 940 may be adapted or operative to form a bonded path for a group of propagation scopes that overlap, wherein the bonded path connects selected entities from each propagation scope in the group with one or more common entities in an intersection of the group; and the solution finding module 950 may be adapted or operative to find a runtime adjustment solution for the group subject to all constraints in which entities of the bonded path participate.

FIG. 10 illustrates a computer system 1000 within which a set of instructions, for causing the machine to perform any one or more of the methodologies, e.g., methods, algorithms, steps or logic, discussed herein, may be executed. In one embodiment, the computer system 1000 may be part of a networked system, and/or operate in a cloud computing environment where multiple server computers in one or more service centers collectively provide computing services on demand. While only a single machine is illustrated, the term "machine" shall also be taken to include any collection of machines (e.g., computers) that individually or jointly execute one or more sets of instructions to perform any one or more of the methodologies discussed herein.

The computer system 1000 includes processing circuitry 1002, such as one or more general-purpose processors, each of which can be: a microprocessor, a central processing unit (CPU), a multicore processor, or the like. The processing circuitry 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted or operative to execute the operations of an adjustment agent 120 (also shown in FIG. 1), which contains instructions executable by the processing circuitry 1002 to perform the methods 700, 800 and 810 of FIGS. 7, 8A and 8B, respectively.

In one embodiment, the processor circuitry 1002 is coupled to one or more memory devices such as: a main memory 1004 (e.g., read-only memory (ROM), flash memory, dynamic random access memory (DRAM), etc.), a secondary memory 1018 (e.g., a magnetic data storage device, an optical magnetic data storage device, etc.), and other forms of computer-readable media, which communicate with each other via a bus or interconnect 1030. The memory devices may also include different forms of ROMs, different forms of random access memories (RAMs), static random access memory (SRAM), or any type of media suitable for storing electronic instructions. In one embodiment, the memory devices may store the code and data of the adjustment agent 120, which may be entirely or partially stored in one or more of the locations shown as dotted boxes and labeled by the reference numeral 120, or in other location(s) not shown in FIG. 10.

The computer system 1000 may further include a network interface device 1008. A part or all of the data and code of the adjustment agent 120 may be transmitted or received over a network 1020 via the network interface device 1008.

In one embodiment, the computer system 1000 stores code (composed of software instructions) and data using computer-readable media, such as non-transitory tangible computer-readable media (e.g., computer-readable storage media such as magnetic disks; optical disks; read only memory; flash memory). The term "non-transitory computer-readable medium" should be taken to include a single medium or multiple media (e.g., a centralized or distributed database, and/or associated caches and servers) that store the one or more sets of instructions. The computer system 1000 may also receive and transmit (internally and/or with other electronic devices over a network) code and data using transitory computer-readable transmission media (e.g., electrical, optical, acoustical or other form of propagated signals).

In one embodiment, a non-transitory computer-readable medium stores thereon instructions that, when executed on one or more processors of the computer system 1000, cause the computer system 1000 to perform the methods 700, 800 and 810 of FIGS. 7, 8A and 8B, respectively.

The operations of the flow diagrams of FIGS. 7, 8A and 8B, as well as Algorithm_1, Algorithm_2, Algorithm_3 and Algorithm_4 may be performed by the embodiments of FIGS. 1, 9 and 10. However, it should be understood that the operations of the flow diagrams and algorithms can be performed by embodiments of the invention other than those discussed with reference to FIGS. 1, 9 and 10, and the embodiments discussed with reference to FIGS. 1, 9 and 10 can perform operations different than those discussed with reference to the flow diagrams and algorithms. While the flow diagrams and algorithms show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for runtime adjustment of a configuration model of a system, comprising:
   receiving, at runtime, a change request directed at one or more modified entities in the configuration model;
   identifying a set of infringing entities among the one or more modified entities based on leadership information, wherein the leadership information indicates an impact that one entity has on another entity with respect to a given constraint, wherein the set of infringing entities violate a plurality of constraints in the configuration model;
   identifying a propagation scope for each violated constraint of the plurality of constraints, wherein the propagation scope includes one of the infringing entities and a set of other entities that are potentially affected by the change request;
   forming groups of propagation scopes by incrementally adding a propagation scope to a group if the added propagation scope overlaps with at least one propagation scope in the group;
   finding a runtime adjustment solution for each group;
   accepting the change request if all the groups have a solution and applying the change request and the solution of at least one of the groups; and
   rejecting the change request if any of the groups has no solution.

2. The method of claim 1, wherein at least one propagation scope has no overlap with other propagation scopes, the method further comprising:
   finding another runtime adjustment solution for the at least one propagation scope separately from the other propagation scopes.

3. The method of claim 1, wherein finding a runtime adjustment comprises forming a bonded path connecting selected entities from each propagation scope in the group with one or more common entities in an intersection of the group.

4. The method of claim 3, wherein forming the bonded path further comprises:
   for each propagation scope in the group, creating a set of paths each of which includes an ordered set of entities, and one of any two entities in the path has an impact on the other one according to the leadership information; and
   selecting at least a path from each propagation scope in the group that connects the one infringing entity of the propagation scope with at least one common entity in the intersection of the group to form a combination of selected paths as the bonded path.

5. The method of claim 4, wherein each path in the collection ends with a sink entity having a follower role only, or with an entity having a follower role in addition to a leader or peer role for another entity that is already on the path.

6. The method of claim 3, further comprising:
   when no runtime adjustment solution is found for the bonded path, finding the runtime adjustment solution subject to all constraints in the group.

7. The method of claim 1, wherein finding a runtime adjustment comprises forming a collection of paths in the propagation scope, each path connecting the infringing entity to one or more of the other entities.

8. The method of claim 7, wherein identifying the infringing entity further comprises:
   identifying an entity among the one or more modified entities that has a leader role or a peer role as the infringing entity.

9. The method of claim 7, wherein each path in the collection of paths includes an ordered set of entities, in which one of any two entities in the path has an impact on the other one.

10. The method of claim 7, wherein selecting the path further comprises:
    for each selected path starting from the infringing entity, incrementally adding one entity at a time to a set of entities on the path; and
    finding the runtime adjustment solution for the set of entities to satisfy a set of constraints imposed on the set of entities.

11. The method of claim 10, wherein an incrementally added entity has a follower role with respect to a first constraint and a leader role with respect to a second constraint, the method further comprises:
    finding the runtime adjustment solution for the set of entities to satisfy the set of constraints that include the violated constraint, the first constraint and the second constraint; and
    when no runtime adjustment solution is found, finding the runtime adjustment solution for the set of entities to satisfy the set of constraints including the violated constraint and the first constraint, and excluding the second constraint.

12. The method of claim 7, further comprising:
when all paths in the collection are exhausted and no runtime adjustment solution is found, finding the runtime adjustment solution subject to all constraints in the propagation scope.

13. The method of claim 12, wherein each path in the collection ends with a sink entity having a follower role only, or with an entity having a follower role in addition to a leader or peer role for another entity that is already on the path.

14. A system for runtime adjustment of a configuration model, comprising:
a memory; and
processing circuitry coupled to the memory, wherein the processing circuitry is adapted to:
receive, at runtime, a change request directed at one or more modified entities in the configuration model;
identify a set of infringing entities among the one or more modified entities based on leadership information, wherein the leadership information indicates an impact that one entity has on another entity with respect to a given constraint, wherein the set of infringing entities violate a plurality of constraints in the configuration model;
identify a propagation scope for each violated constraint of the plurality of constraints, wherein the propagation scope includes one of the infringing entities and a set of other entities that are potentially affected by the change request;
form groups of propagation scopes by incrementally adding a propagation scope to a group if the added propagation scope overlaps with at least one propagation scope in the group;
find a runtime adjustment solution for each group;
accept the change request if all the groups have a solution and apply the change request and the solution of at least one of the groups; and
reject the change request if any of the groups has no solution.

15. The system of claim 14, wherein at least one propagation scope has no overlap with other propagation scopes, and wherein the processing circuitry is further adapted to:
find another runtime adjustment solution for the at least one propagation scope separately from the other propagation scopes.

16. The system of claim 14, wherein the processing circuitry is further adapted to:
find a runtime adjustment by forming a bonded path connecting selected entities from each propagation scope in the group with one or more common entities in an intersection of the group.

17. The system of claim 16, wherein the processing circuitry is further adapted to:
for each propagation scope in the group, create a set of paths each of which includes an ordered set of entities, and one of any two entities in the path has an impact on the other one according to the leadership information; and
select at least a path from each propagation scope in the group, wherein the selected path connects the one infringing entity of the propagation scope with at least one common entity in the intersection of the group to form a combination of selected paths as the bonded path.

18. The system of claim 17, wherein each path in the collection ends with a sink entity having a follower role only, or with an entity having a follower role in addition to a leader or peer role for another entity that is already on the path.

19. The system of claim 16, wherein the processing circuitry is further adapted to:
when no runtime adjustment solution is found for the bonded path, find the runtime adjustment solution subject to all constraints in the group.

20. The system of claim 14, wherein the processing circuitry is further adapted to:
find a runtime adjustment by forming a collection of paths in the propagation scope, each path connecting the infringing entity to one or more of the other entities.

21. The system of claim 20, wherein the processing circuitry is further adapted to:
identify an entity among the one or more modified entities that has a leader role or a peer role as the infringing entity.

22. The system of claim 20, wherein each path in the collection of paths includes an ordered set of entities, in which one of any two entities in the path has an impact on the other one.

23. The system of claim 20, wherein the processing circuitry is further adapted to:
for each selected path starting from the infringing entity, incrementally add one entity at a time to a set of entities on the path;
find the runtime adjustment solution for the set of entities to satisfy a set of constraints imposed on the set of entities.

24. The system of claim 23, wherein an incrementally added entity has a follower role with respect to a first constraint and a leader role with respect to a second constraint, the processing circuitry is further adapted to:
find the runtime adjustment solution for the set of entities to satisfy the set of constraints that include the at least one constraint, the first constraint and the second constraint; and
when no runtime adjustment solution is found, find the runtime adjustment solution for the set of entities to satisfy the set of constraints including the at least one constraint and the first constraint, and excluding the second constraint.

25. The system of claim 20, wherein the processing circuitry is further adapted to:
when all paths in the collection are exhausted and no runtime adjustment solution is found, find the runtime adjustment solution subject to all constraints in the propagation scope.

26. The system of claim 25, wherein each path in the collection ends with a sink entity having a follower role only, or with an entity having a follower role in addition to a leader or peer role for another entity that is already on the path.

* * * * *